US008671686B2

(12) United States Patent
Pinkerton et al.

(10) Patent No.: US 8,671,686 B2
(45) Date of Patent: Mar. 18, 2014

(54) SYSTEMS AND METHODS FOR PROVIDING BACKUP ENERGY TO A LOAD

(75) Inventors: Joseph F. Pinkerton, Austin, TX (US); David Beatty, Austin, TX (US); David E. Perkins, Austin, TX (US)

(73) Assignee: Active Power, Inc., Austin, TX (US)

( * ) Notice: Subject to any disclaimer, the term of this patent is extended or adjusted under 35 U.S.C. 154(b) by 1045 days.

(21) Appl. No.: 12/703,026

(22) Filed: Feb. 9, 2010

(65) Prior Publication Data

US 2011/0196542 A1  Aug. 11, 2011

Related U.S. Application Data

(60) Continuation of application No. 12/564,644, filed on Sep. 22, 2009, now abandoned, which is a continuation of application No. 11/510,248, filed on Aug. 24, 2006, now Pat. No. 7,681,395, and a division of application No. 10/361,728, filed on Feb. 5, 2003, now Pat. No. 7,127,895.

(51) Int. Cl.
    *F01K 13/02* (2006.01)
(52) U.S. Cl.
    USPC ............... 60/646; 60/650; 60/652; 60/657; 60/659
(58) Field of Classification Search
    USPC .................. 60/646, 650, 652, 657, 659
    See application file for complete search history.

(56) References Cited

U.S. PATENT DOCUMENTS

| | | | | |
|---|---|---|---|---|
| 5,491,969 A * | 2/1996 | Cohn et al. | ................ | 60/775 |
| 5,537,822 A * | 7/1996 | Shnaid et al. | ................ | 60/659 |
| 5,845,479 A * | 12/1998 | Nakhamkin et al. | ............ | 60/777 |
| 5,934,063 A * | 8/1999 | Nakhamkin | ................ | 60/773 |
| 6,192,687 B1 * | 2/2001 | Pinkerton et al. | ............ | 60/646 |
| 6,321,539 B1 * | 11/2001 | Bronicki et al. | ............ | 60/641.8 |
| 6,463,738 B1 * | 10/2002 | Pinkerton et al. | ............ | 60/646 |
| 6,494,042 B2 * | 12/2002 | Bronicki | ................ | 60/651 |
| 6,883,328 B2 * | 4/2005 | Bronicki | ................ | 60/670 |
| 7,127,895 B2 * | 10/2006 | Pinkerton et al. | ............ | 60/646 |
| 7,681,395 B2 * | 3/2010 | Pinkerton et al. | ............ | 60/646 |
| 2001/0000091 A1 * | 4/2001 | Nakhamkin et al. | ......... | 60/39.05 |

* cited by examiner

*Primary Examiner* — Hoang Nguyen
(74) *Attorney, Agent, or Firm* — Hulsey P.C.; William N. Hulsey, III; Jacob S. Mattis

(57) ABSTRACT

Backup energy systems utilizing compressed air storage (CAS) systems and bridging energy systems to supply backup power to a load are provided. During a power failure, the bridging energy system provides backup power to the load at least until the CAS system begins supplying adequate power. In various embodiments, backup power capability is enhanced through the use of one or more exhaustless heaters, which are used to heat compressed air. The compressed air, in turn, drives a turbine which is used to power an electrical generator. In various embodiments, ambient air heat exchangers or other types of heat exchangers are used to heat compressed air prior to the compressed air being routed to the turbine, thereby increasing system efficiency. Backup power and backup HVAC are also provided by utilizing turbine exhaust, heat exchangers and various resistive heating elements.

19 Claims, 19 Drawing Sheets

SYSTEMS AND METHODS FOR PROVIDING BACKUP ENERGY TO A LOAD

REFERENCES TO RELATED APPLICATIONS

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility application Ser. No. 12/564,644, entitled "SYSTEM AND METHODS FOR PROVIDING BACKUP ENERGY TO A LOAD," filed Sep. 22, 2009 now abandoned, which claims priority pursuant to 35 U.S.C. §120, as a divisional, to the following U.S. Utility Patent Applications which are hereby incorporated herein by reference in its entirety and made part of the present U.S. Utility Patent Application for all purposes:
   a. U.S. Utility application Ser. No. 10/361,728, entitled "SYSTEM AND METHODS FOR PROVIDING BACKUP ENERGY TO A LOAD," filed Feb. 5, 2003, issued as U.S. Pat. No. 7,127,895 which is hereby incorporated herein by reference in its entirety and made part of the present U.S. Utility Patent Application for all purposes.
2. U.S. Utility application Ser. No. 11/510,248, entitled "SYSTEM AND METHODS FOR PROVIDING BACKUP ENERGY TO A LOAD," filed Aug. 24, 2006 now abandoned, which claims priority pursuant to 35 U.S.C. §120, as a divisional, to the following U.S. Utility Patent Applications which are hereby incorporated herein by reference in its entirety and made part of the present U.S. Utility Patent Application for all purposes:
   b. U.S. Utility application Ser. No. 10/361,728, entitled "SYSTEM AND METHODS FOR PROVIDING BACKUP ENERGY TO A LOAD," filed Feb. 5, 2003, issued as U.S. Pat. No. 7,127,895 which is hereby incorporated herein by reference in its entirety and made part of the present U.S. Utility Patent Application for all purposes.

TECHNICAL FIELD OF THE INVENTION

This invention relates to backup energy systems for supplying backup power to a load. More particularly, this invention relates to backup energy systems that use the combination of a compressed air storage (CAS) system and an energy storage system, or bridging energy system, to provide backup power to a load during a failure of a primary power source

BACKGROUND OF THE INVENTION

CAS systems are well known. CAS systems use compressed air to drive a turbine, which in turn powers an electrical generator. Prior to reaching the turbine, the compressed air may be heated using a suitable type of fuel-combustion system. Alternatively, an exhaustless heater may be used to heat the compressed air. This type of CAS, which uses an exhaustless heater, is known as a combined thermal and compressed air storage (TACAS) system. Such systems are disclosed in a commonly-assigned, co-pending U.S. patent application Ser. No. 10/361,729, filed Feb. 5, 2003, entitled "Thermal and Compressed Air Storage System," which is hereby incorporated by reference in its entirety.

When the turbine is driven by the compressed air, heated or not, the turbine powers an electrical generator that produces electrical power at an output. The use of CAS systems alone to provide backup power, however, is not practical in applications where, for example, even a very brief power outage to a load is detrimental. In CAS systems, there typically is a slight delay because the rotor of the turbine must be sped up before the turbine is able to power the electrical generator. This renders the use of CAS systems, by themselves, an unacceptable manner in which to provide backup power in many applications.

Energy storage systems, on the other hand, provide substantially instantaneous backup power to a load in the event of a primary power source failure. An example of an energy storage system is a bank of chemical batteries, which includes one or more chemical batteries. In order to maintain backup power capability, these batteries are either replaced once drained or charged during normal operating conditions (e.g., when utility power is providing sufficient power). In the latter case, the bank of chemical batteries is connected to a battery charger which provides a trickle charge to keep the batteries energized during normal operating conditions. The energy stored in the chemical batteries is then used to supply power to the load during a utility power failure.

Chemical batteries, however, suffer from various deficiencies, including bulkiness, lack of reliability, limited lifespan, temperature sensitivity, high maintenance costs and relatively low safety. For example, chemical batteries require relatively constant and complex recharging, depending on the type of batteries involved, to insure that the batteries continue to operate efficiently and maintain their full storage capacity. Moreover, chemical battery banks must typically be located in remote battery storage rooms which house the batteries, in part due to safety considerations and bulkiness, and must be replaced approximately every 3-8 years due to the limited lifespan of the batteries. Additionally, high maintenance costs arise from the need to install special venting and air-conditioning systems for dedicated battery storage rooms.

Another commonly used type of energy storage system is a flywheel energy storage system. During normal operating conditions, a flywheel is rotated by the primary power source such that it stores kinetic energy in the form of rotational momentum (see, e.g., Clifton et al. U.S. Pat. No. 5,731,645, which is hereby incorporated by reference herein in its entirety). When the primary power fails, the kinetic energy stored in the flywheel is used to drive a generator, which provides the load with backup power. Flywheel energy storage systems, however, are only capable of supplying backup power to the load for a relatively short period of time (e.g., until the kinetic energy in the flywheel has been used up). Once the energy stored in the flywheel energy storage system is depleted, backup power is no longer available for the critical load.

Energy storage systems such as described above are often used in uninterruptible power supply (UPS) systems, which are used to ensure that an interruption in power from the primary power source (e.g., a utility power failure) does not lead to disturbance of the power being supplied to the critical load. UPS systems using flywheel energy storage systems, for example, are described in Gottfried U.S. Pat. No. 4,460,834. Alternatively, Pinkerton et al. U.S. Pat. No. 6,255,743 describes a UPS system which utilizes a turbine energy storage system, while Pinkerton et al. U.S. Pat. No. 6,192,687 describes a UPS system which utilizes a source of thermal energy to produce backup electrical power.

Generally, when a critical load is being powered by utility power, known UPS systems store energy in an energy storage system, or bridging energy system. Thereafter, during a failure in utility power (i.e., when the utility power source is not able to provide power at a predetermined quantity or quality level), these UPS systems begin supplying backup power to the critical load using the energy stored in the energy storage system. Moreover, persons skilled in the art will appreciate that power conditioning or other typical UPS features may be included to further enhance the ability to provide continuous power to the critical load.

The UPS systems described above, however, suffer from various deficiencies. Known flywheel-UPS systems, for example, have only a limited supply of backup energy. UPS systems using battery banks, moreover, are problematic because they suffer from over-temperature conditions when utility power is not present to power heating, ventilation, and air conditioning (HVAC) systems.

In view of the foregoing, it is an object of this invention to provide backup energy systems which provide undisturbed power to a critical load while eliminating problems associated with known backup energy systems.

BRIEF SUMMARY OF THE INVENTION

Embodiments of the present disclosure are directed to systems and methods that are further described in the following description and claims. Advantages and features of embodiments of the present disclosure may become apparent from the description, accompanying drawings and claims.

These and other objects of the present invention are accomplished in accordance with the principles of the present invention by providing various backup energy systems which utilize a combination of CAS systems and energy storage systems. These energy storage systems function as bridging energy systems which supply energy between the time that utility power fails and the CAS system begins supplying sufficient power to the load.

In one embodiment, when utility power is available, it supplies power to the critical load while also providing power that is stored in the bridging energy system (e.g., a flywheel energy storage system or a chemical battery bank). Additionally, utility power drives a motor that powers a compressor to provide compressed air which is then stored in a pressure tank. When utility power fails, the bridging energy system begins providing power to the critical load. The bridging energy system continues to provide power until compressed air from the pressure tank adequately drives the turbine, which powers a generator to provide power to the critical load.

In a similar embodiment, utility power is used to heat the thermal storage material of a thermal storage unit (TSU) which is added to the CAS system (to form a TACAS system). When utility power fails, the bridging energy system begins supplying power to the load. Compressed air from the pressure tank is then heated by the TSU, an exhaustless heater, prior to the compressed air driving the turbine.

In another embodiment of the present invention, a fuel-combustion system heats compressed air from the pressure tank before the compressed air is routed to the turbine.

In other embodiments of the present invention, various integrated TACAS UPS systems are used to provide uninterruptible power to a critical load. Alternatively, additional types of exhaustless heaters, other than a TSU, may be included to further heat compressed air from the pressure tank before it is routed to the turbine.

In another embodiment of the present invention, a TACAS system is used to provide backup. HVAC in addition to backup power to a critical load, or critical electronics.

In other embodiments of the present invention, the compressor and pressure tank of the above described backup energy systems are replaced with replaceable compressed air cylinders.

BRIEF DESCRIPTION OF THE SEVERAL VIEWS OF THE DRAWINGS

For a more complete understanding of the present disclosure and the advantages thereof, reference is now made to the following description taken in conjunction with the accompanying drawings in which like reference numerals indicate like features and wherein.

DETAILED DESCRIPTION OF THE INVENTION

Preferred embodiments of the present disclosure are illustrated in the FIGs., like numerals being used to refer to like and corresponding parts of the various drawings.

Figure 1A:
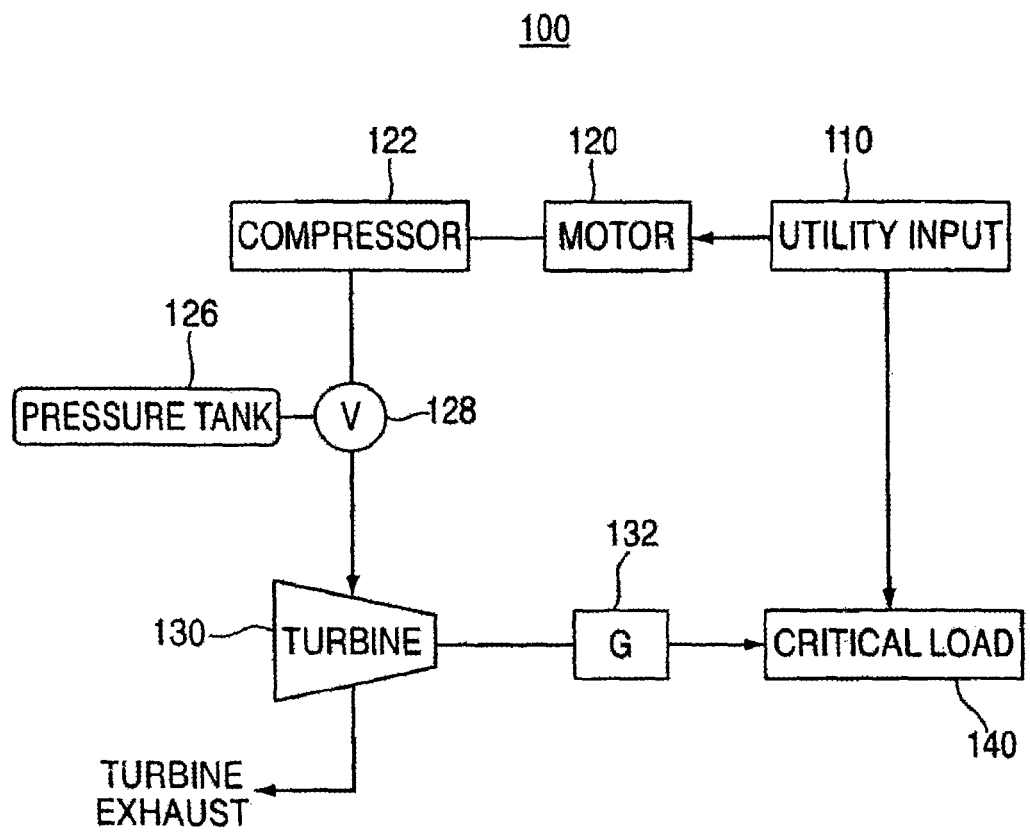
FIG. 1A is a schematic diagram of a conventional CAS system.

FIG. 1A shows a conventional CAS system for providing backup power to a load. CAS system 100 includes a primary power source, utility input 110, that provides input power to motor 120, which may be any conventional type of motor (e.g., a rotary electric machine). Motor 120 is coupled to compressor 122 such that when motor 120 is receiving input power from utility input 110, it drives compressor 122. Compressor 122, when driven by motor 120, supplies compressed air to pressure tank 126 through valve 128. Compressor 122 may be any type of compressor which compacts or compresses air (e.g., atmospheric air) to occupy a smaller space inside of pressure tank 126.

As shown in FIG. 1A, pressure tank 126 is coupled to compressor 122 through valve 128. It should be understood, however, that pressure tank 126 in CAS system 100, as well as the pressure tanks associated with the other systems described herein, may be replaced with any other suitable type of air reservoir capable of storing compressed air. For example, an underground salt dome (not shown) may be used in place of pressure tank 126.

When CAS system 100 is to provide electric power, compressed air from pressure tank 126 is routed through valve 128 to drive turbine 130. The compressed air flows against the turbine rotor (not shown) of turbine 130, which may be any suitable type of turbine (e.g., a radial-flow turbine). In turn, turbine 130 drives electrical generator 132, which provides power to critical load 140.

Moreover, as illustrated in FIG. 1A, turbine 130 releases exhaust air. The exhaust from turbine 130 may be vented through an exhaust pipe (not shown), or simply released to recombine with atmospheric air.

CAS system 100, however, has several deficiencies associated with providing backup power to critical load 140. For example, once utility input 110 stops supplying sufficient power to critical load 140, compressed air from pressure tank 126 must be supplied to turbine 130 for a short period of time before the turbine rotor is rotating at a sufficient rate to allow turbine 130 to properly power electrical generator 132. This poor transient response can result in an inability to provide critical load 140 with an undisturbed supply of power once utility input 110 stops providing sufficient power. Additionally, the duration of backup power provided by CAS system 100 is limited by the amount of compressed air in pressure tank 126. Once pressure tank 126 is depleted, CAS system 100 cannot power critical load 140.

Figure 1B:
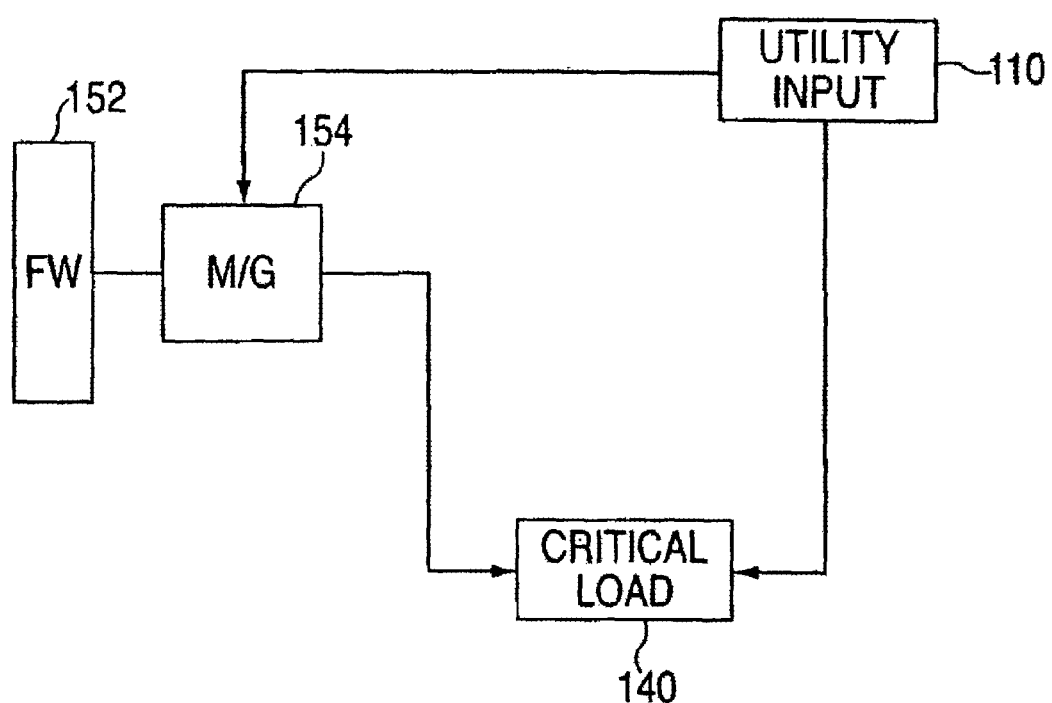
FIG. 1B is a schematic diagram of a conventional flywheel backup energy storage system.

FIG. 1B shows a conventional flywheel backup energy storage system 150 which provides backup power to critical load 140. Unlike CAS system 100 described above, once utility input 110 ceases to provide sufficient power to critical load 140, backup power is almost immediately available to be supplied to critical load 140.

As illustrated in FIG. 1B, during normal operating conditions, utility input 110 supplies power to critical load 140 as well as to electrical machine 154. At this time, electrical machine 154 operates as a motor and drives flywheel 152 such that it stores kinetic energy. Once utility power fails, flywheel 152 begins driving electrical machine 154, now acting as a generator, to supply backup power to critical load 140.

Although the use of a flywheel such as shown in FIG. 1B largely eliminates the problem of discontinuous power being supplied to critical load 140, flywheel 152 is only able to drive electrical machine 154 for a relatively short period of time. After the kinetic energy in flywheel 152 has been used, critical load 140 may become powerless if utility power has not yet returned.

Figure 1C:
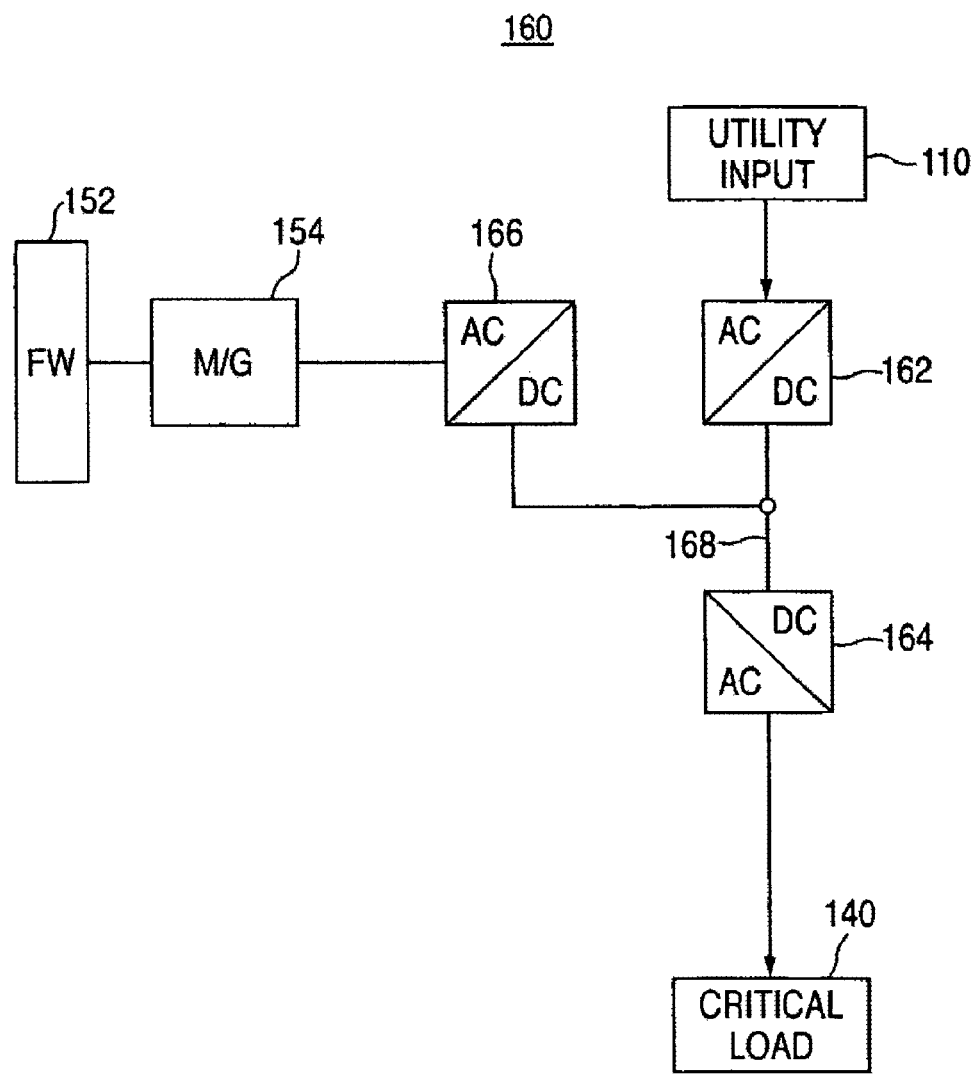
FIG. 1C is a schematic diagram of a conventional flywheel UPS system.

FIG. 1C shows a conventional flywheel UPS system 160 which is similar to the flywheel backup energy storage system 150 shown in FIG. 1B, although it also contains additional AC circuitry.

Flywheel UPS system 160 includes utility input 110. When utility input 110 is supplying sufficient power, the AC power from utility input 110 is fed into AC-to-DC converter 162 and converted to DC power. This DC power, originating from utility input 110, is fed across DC buss 168 to DC-to-AC converter 164, which converts the DC power back to AC power to be supplied to critical load 140. Converters 162 and 164, as well as the remainder of the converters described herein, may be provided as conventional converters, an array of high power semiconductor switches, or other suitable circuitry without departing from the principles of the present invention. For example, AC-to-DC converter 162 may be a simple rectifier circuit, or it may be any other conventional circuit that converts power from AC to DC. Also, for example, DC-to-AC converter 164 may be a simple inverter circuit, or it may be any other AC.

While utility input 110 is supplying power, converter 166 converts DC power from DC buss 168 to AC power which is provided to electrical machine 154. At this time, electrical machine 154 (which, as explained above, can operate at different times as a motor or as a generator) is operating as a motor and rotates flywheel 152 so that flywheel 152 stores kinetic energy.

DC buss 168 is monitored by UPS control electronics (not shown), which, depending on the available source of power, controls whether critical load 140 is supplied power from either utility input 110, flywheel 152 or both. Once a utility power failure is detected, the kinetic energy of flywheel 152 is used to supply backup power to critical load 140. At this time, the kinetic energy of flywheel 152 is used to drive electrical machine 154, now operating as a generator, to produce AC power. This AC power is converted by converter 166 to DC power and supplied to DC buss 168. Flywheel 152 continues to provide power to DC buss 168 until either it is drained of power or until utility input 110 resumes supplying adequate power to critical load 140, as determined by the UPS control electronics (not shown). As with flywheel backup energy storage system 150, a significant limitation of flywheel UPS system 160 is that flywheel 152 can store only a limited amount of energy to provide backup power to critical load 140.

Figure 2:
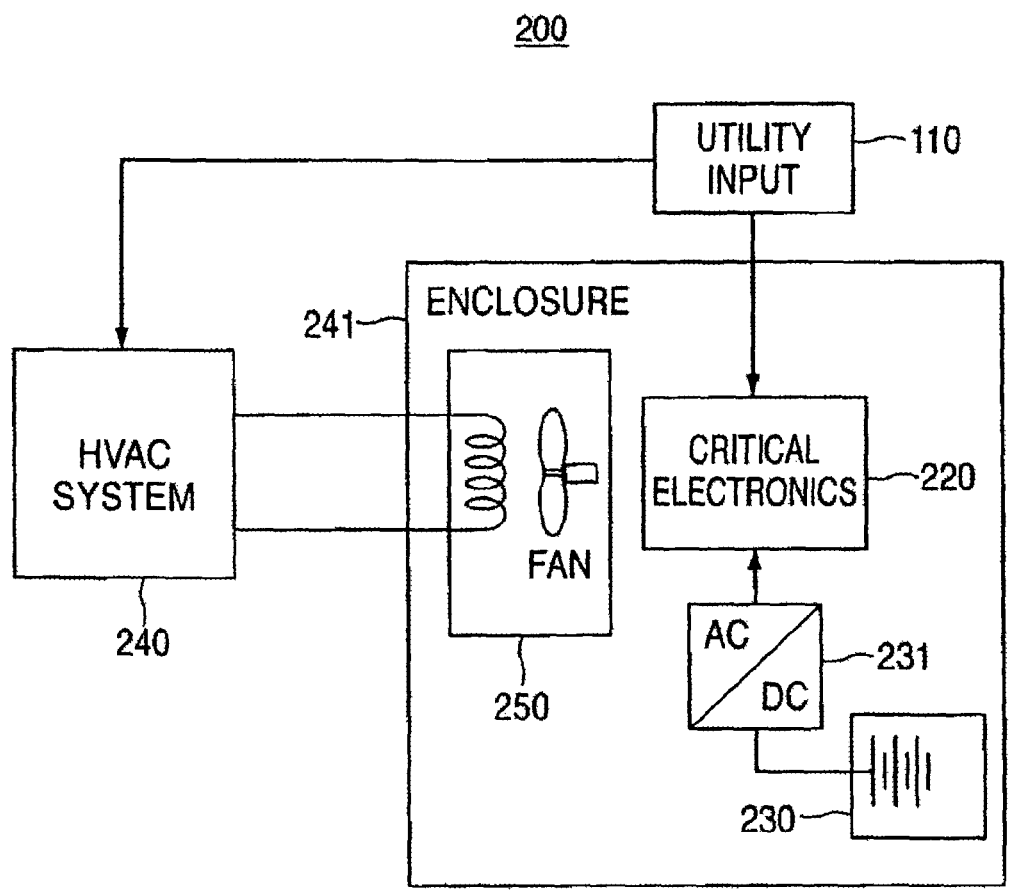
FIG. 2 is a schematic diagram of a conventional backup energy system using an HVAC system.

FIG. 2 shows a conventional backup energy system 200 using an HVAC system 240 to maintain critical electronics being powered within acceptable temperature limits. When operating normally, utility input 110 supplies power to operate critical electronics 220 (e.g., telecommunications electronics). At this time, utility input 110 also supplies power to HVAC system 240, which uses a conventional ambient air heat exchanger 250 in order to maintain the temperature within housing 241 below a predetermined level.

Housing 241 also includes a bank of batteries 230 which supplies short-term backup power to critical electronics 220, through DC to AC converter 231, when utility power 110 has failed. When utility input 110 is not available to power HVAC system 240, however, backup energy system 200 is prone to suffer from over-temperature conditions. These over-temperature conditions not only negatively impact the operation of critical electronics 220, but they further degrade the performance of battery bank 230. Such degradation in performance arises in the form of a shortened duration for which battery bank 230 is capable of providing backup power.

Figure 3:
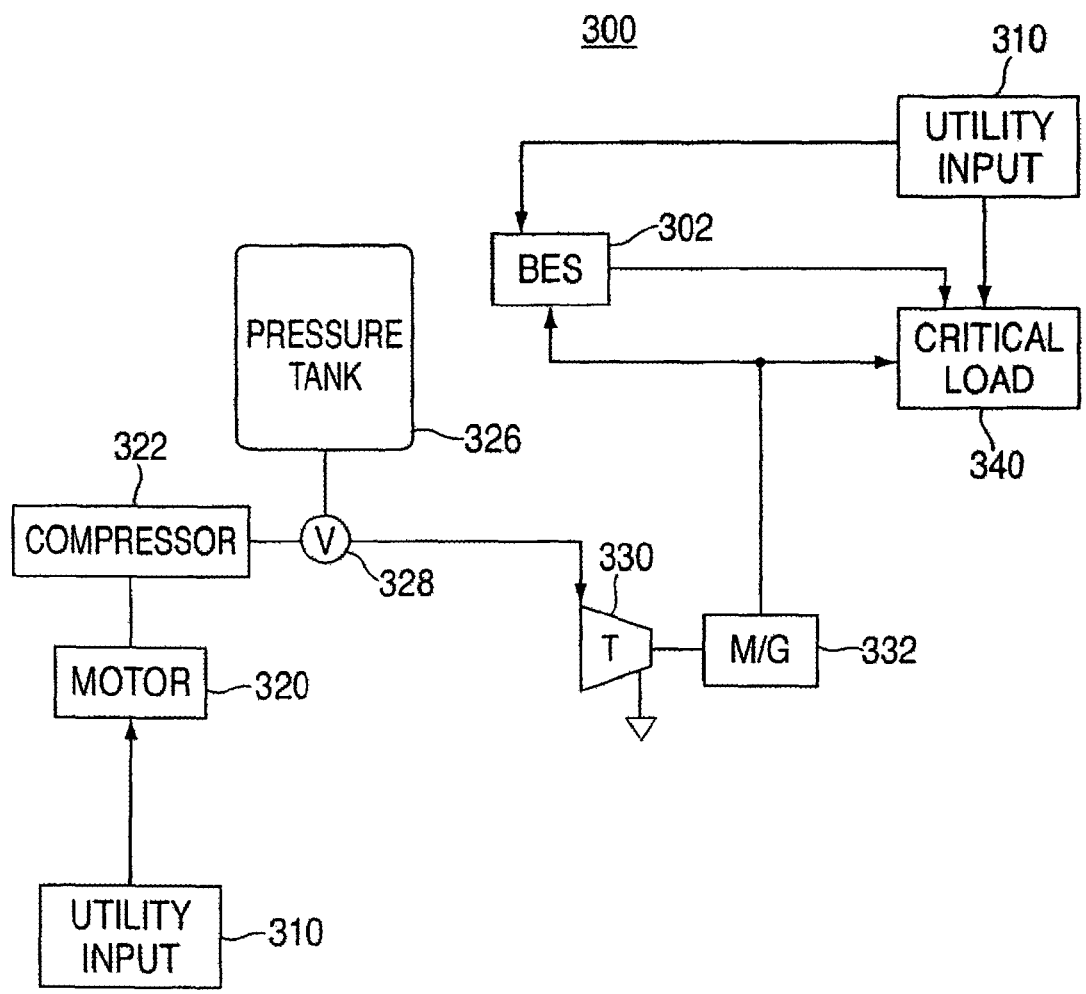
FIG. 3 is a schematic diagram of a backup energy system in accordance with the principles of the present invention.

FIG. 3 shows a backup energy system 300 for providing backup power to a load in accordance with the principles of the present invention. Backup energy system 300 and the other systems described below are shown to include several components which, as persons skilled in the art will appreciate, may be combined as desired in accordance with the principles of the present invention without departing from the spirit of the present invention.

Backup energy system 300 includes utility input 310 which supplies power to critical load 340 during normal operating conditions. Persons skilled in the art will appreciate that utility input 310 (or utility input 110 described above) may be any suitable type of primary power source. As illustrated in FIG. 3, backup energy system 300 also includes a bridging energy system 302 integrated with the components of a CAS system in order to provide backup power to critical load 340. Backup energy system 300 includes motor 320, compressor 322, pressure tank 326, valve 328, turbine 330 and electrical machine 332. Bridging energy system 302 may be any suitable type of energy storage system capable of supplying a short term backup supply of power (e.g., a flywheel energy storage system).

During normal operating conditions, utility input 310 supplies critical load 340 with power. Utility power 310 also provides bridging energy system 302 with power so that it can store energy to be used, for example, during a power outage. Additionally, utility input 310 powers motor 320 which drives compressor 322 such that compressed air is routed through valve 328 and stored in pressure tank 326. It should be understood that pressure tank 326 can be replaced by any other suitable type of compressed air reservoir, such as an underground salt dome.

Compressor 322, meanwhile, can be any suitable type of compressor which compacts or compresses air (e.g., atmospheric air) to occupy a smaller space inside of pressure tank 326. Valve 328 may be a conventional valve or any other suitable device for selectively permitting or preventing the flow of air. Moreover, rather than using a single valve 328 to direct the flow of air from compressor 322 to pressure tank 326 and from pressure tank 326 to turbine 330, two separate valves may be used.

When there is a utility power failure, stored energy in bridging energy system 302 is used to power critical load 340. Shortly after utility input 310 stops providing adequate power (e.g., after approximately a few seconds), valve 328 is opened so that compressed air is routed to turbine 330. It should be understood that turbine 330 may be any type of conventional air turbine. For example, turbine 330 may be a radial-flow turbine, an impulse turbine or a reaction turbine. Turbine 330 in turn powers electrical machine 332, acting as a generator, to provide power to critical load 340. For a relatively short period of time, both bridging energy system 302 and the components of the CAS system may be used to power critical load 340. After this short period of time (e.g., less than approximately 10 seconds), the CAS system of backup energy system 300 becomes the only source of power for critical load 340 until utility power 310 returns. Moreover, during the time that the CAS system is the sole supplier of power to critical load 340, bridging energy system 302 begins to draw a small amount of energy from the output of electrical machine 332 as it recharges.

Persons skilled in the art appreciate that the response by turbine 330 to step changes in the critical load 340 may be inadequate for certain applications. Accordingly, bridging energy system 302, in addition to providing power to critical load 340 until electrical machine 332 is supplying adequate power, preferably also compensates for step changes in the critical load 340. For example, bridging energy system 302 may be used to discharge or absorb energy during step changes in the critical load 340 to ensure a continuous supply of power to the critical load 340.

Persons skilled in the art will also appreciate that it is within the scope of the present invention to supply utility power in any of the embodiments described herein directly to electrical machine 332, which can be capable of operating at different times as a motor and a generator. Moreover, when supplied with power from utility input 310 or another power source, electrical machine 332 can operate as a motor to drive turbine 330 such that the turbine rotor (not shown) is constantly rotated. In this manner, the transient response of turbine 330 may be improved, thus allowing turbine 330 to also act as the bridging energy system, providing substantially immediate backup power to critical load 340 during a power failure. Accordingly, a separate bridging energy system may not be necessary if the rotor of turbine 330 is continuously spinning when utility power 310 is available. It should be understood, however, that it may be preferable to conserve energy and not use power from utility input 310 to maintain the rotation of the turbine rotor. Furthermore, although critical load 340 is shown as requiring AC power, the invention is not limited in this manner. In certain applications, critical load 340 may be DC electronics, in which case converters (not shown) may be used as necessary in order to supply DC power to critical load 340 from any of the power sources described herein.

Figure 4:
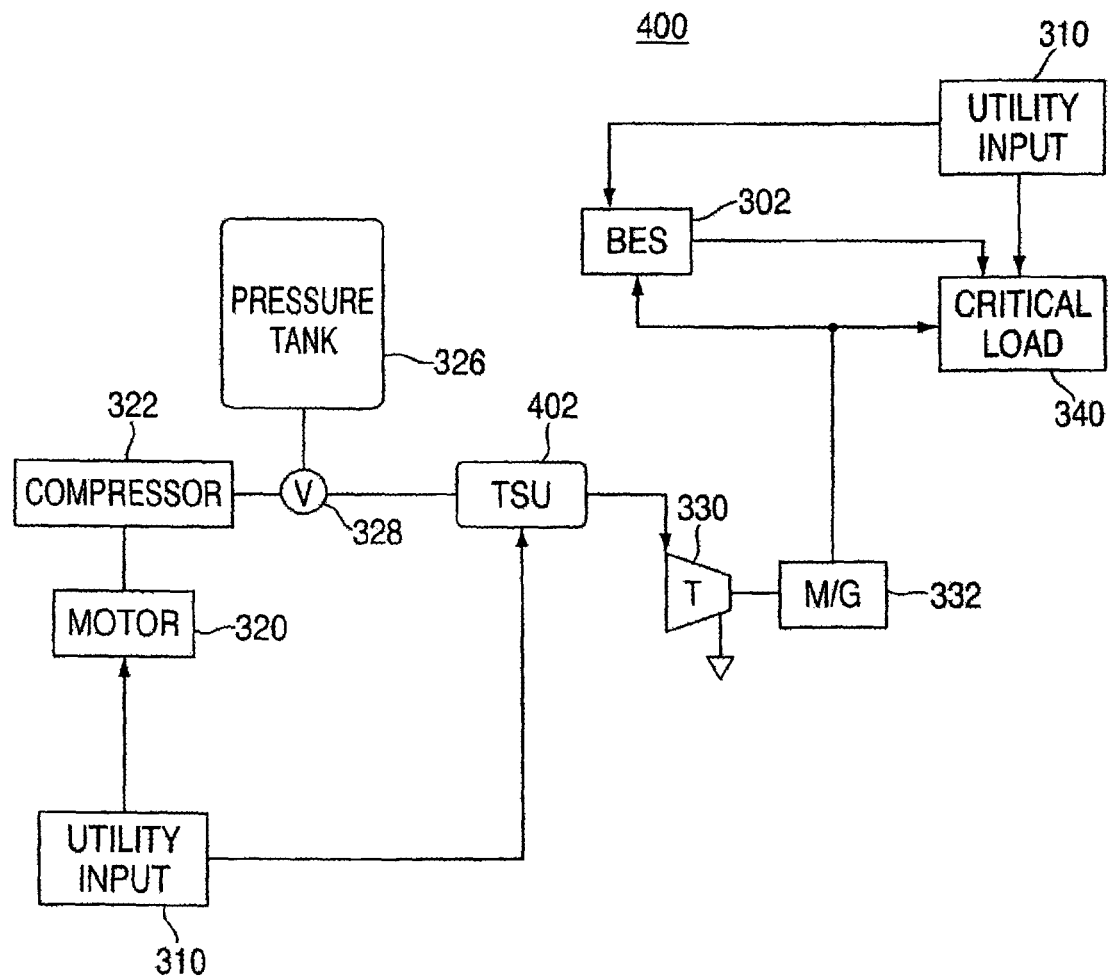
FIG. 4 is a schematic diagram of another backup energy system in accordance with the principles of the present invention.

FIG. 4 shows another backup energy system 400 in accordance with the principles of the present invention. Backup energy system 400 is similar to backup energy system 300, except that backup energy system 400 also includes an exhaustless heater, TSU 402. It will be understood by persons skilled in the art that the term exhaustless heater as used herein refers to any type of heater which does riot produce a waste product (e.g., a noxious emission). Persons skilled in the art will also appreciate that that TSU 402 may be any suitable type of thermal storage unit, which can transfer heat from the thermal storage material (not shown) in TSU 402 to the compressed air coming from pressure tank 326 (via valve 328) before the air is provided to turbine 330.

When utility input 310 is supplying power to critical load 340, it is also used to heat the thermal storage material (not shown) of TSU 402 to at least a predetermined temperature. Persons skilled in the art will appreciate that the thermal storage material of TSU 402 may be heated by any suitable type of heating system. The thermal storage material of TSU 402 may be heated, for example, by a resistive heater (not shown). Additionally, for example, a closed-loop pipe containing a working fluid (e.g., oil) that is heated may be used. In this case, the heated fluid pumped through a closed-loop pipe may be used to convey thermal energy to the working fluid (or other type of material) that makes up the thermal storage material of TSU 402. Alternatively, an induction heater may be used to heat the thermal storage material of TSU 402.

As illustrated in FIG. 4, once backup power is needed, stored energy in bridging energy system 302 is used to power critical load 340. Shortly thereafter, compressed air is routed through TSU 402 such that the compressed air is heated prior to entering turbine 330. The benefit of heating compressed air from pressure tank 326 prior to being routed to turbine 330 is that less compressed air is required to produce the same amount of electrical output from electrical machine 332.

Figure 5:
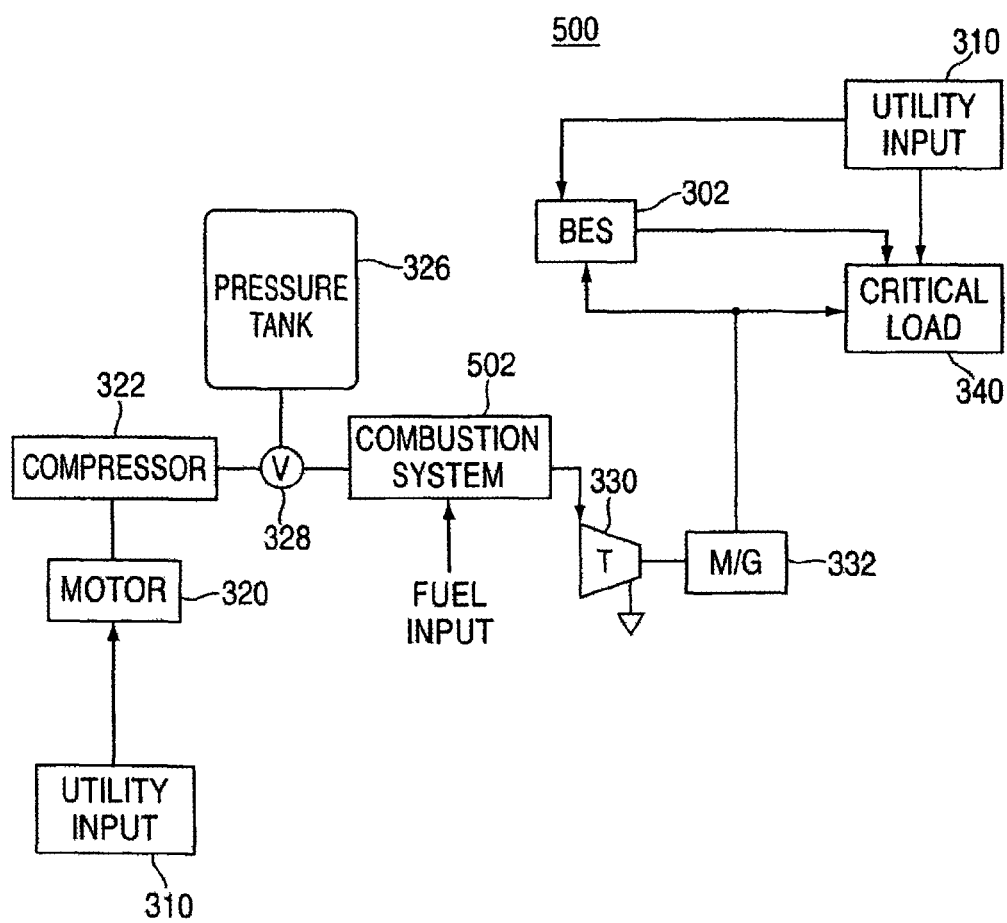
FIG. 5 is a schematic diagram of another backup energy system in accordance with the principles of the present invention.

As an alternative to using TSU 402, which requires an electrical power source such as utility input 310 to maintain the temperature of the thermal storage unit therein, a fuel-combustion system can be used in accordance with the principles of the present invention to heat compressed air from pressure tank 326. FIG. 5 shows a schematic diagram of a backup energy system 500, which utilizes a fuel-combustion system 502, for providing backup power to critical load 340. Backup energy system 500 is substantially identical to backup energy system 400, except that TSU 402 has been replaced by fuel-combustion system 502.

When there is a utility power failure, bridging energy system 302 provides substantially instantaneous backup power to critical load 340 (as described above). Compressed air from pressure tank 326 is then routed through valve 328 to combustion system 502. Combustion system 502, as illustrated in FIG. 5, receives a fuel input which is mixed with the air being supplied through valve 328. Combustion system 502 ignites and burns the fuel, and the resulting heated air is supplied to turbine 330.

The hot air emerging from combustion system 502 flows against the turbine rotor (not shown) of turbine 330. Once driven by the heated compressed air, turbine 330 powers electrical machine 332 so that electrical machine 332 provides power to critical load 340.

Figure 6:
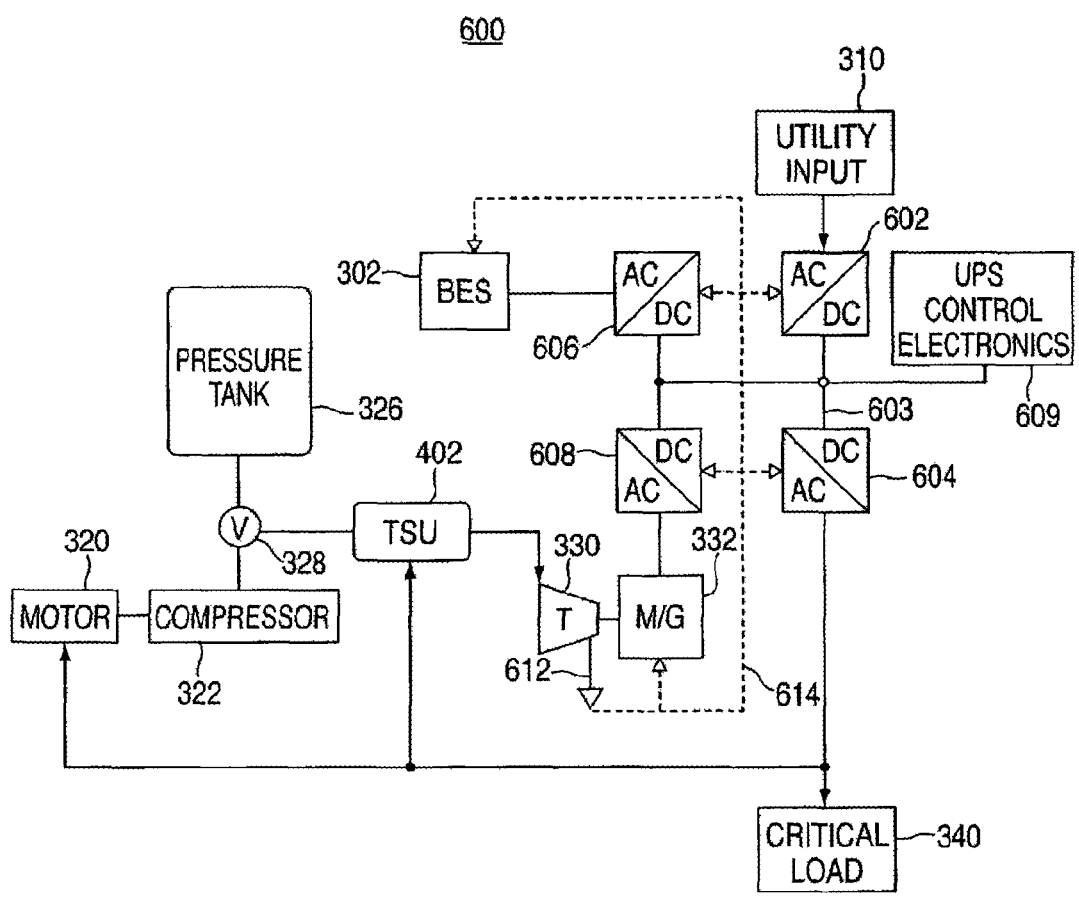
FIG. 6 is a schematic diagram of an integrated TACAS UPS system in accordance with the principles of the present invention.

FIG. 6 shows an integrated TACAS UPS system 600 for providing backup power to a load during a utility power failure (e.g., during degradation in the power being supplied by the utility power source or a complete loss of utility power) in accordance with the principles of the present invention. While TACAS UPS system 600 and the other TACAS UPS systems described herein are capable of providing backup power during a loss of utility power, the TACAS UPS systems may also provide backup power, power conditioning or other typical UPS features to the critical load during a degradation of the power (e.g., when the quality level of the utility power is not adequate). Persons skilled in the art will appreciate that during a short term degradation of the utility power source, for example, bridging energy system 302 may provide temporary backup power to critical load 340 without electrical machine 332 having to come online.

In addition to the components found in backup energy system 400, TACAS UPS system 600 also includes converters 602, 604, 606, and 608, DC buss 603 and UPS control electronics 609. When utility input 310 is supplying adequate power, the power from utility input 310 is supplied through converters 602 and 604, which precisely regulate the electrical output that is fed to critical load 340. It should be noted that although UPS systems which convert AC power from a primary power source to DC power and then back to AC power to be supplied to the load are explained herein (these types of UPS systems are known as double-conversion UPS systems), the invention is not limited in this manner. Other types of UPS systems (not shown) such as line-interactive UPS systems or single conversion UPS systems may be used without departing from the scope of the present invention.

Another converter 606 converts DC power from DC buss 603 to AC power which is used to charge bridging energy system 302. Although converter 606 is shown as a single converter capable of converting power from DC to AC and from AC to DC, such as other converters described herein, two separate converters may be used without departing from the scope of the present invention.

In addition to supplying power to critical load 340, the output of DC-to-AC converter 604 is used to supply power to motor 320 and TSU 402 as illustrated in FIG. 6. Although, it should be understood by those skilled in the art that utility input 310 can directly supply power to motor 320 or TSU 402 without departing from the scope of the present invention.

When motor 320 is receiving power from primary power source 310, motor 320 drives compressor 322, which supplies compressed air through valve 328 to pressure tank 326. As explained above, pressure tank 326 can be any suitable type of air reservoir capable of storing compressed air, such as an underground salt dome.

During a power failure, the energy stored in bridging energy system 302 is used to power DC buss 603, through converter 606, for a relatively short period of time (e.g., up to approximately 2-5 seconds). Shortly after utility input 310 has failed (e.g., after approximately a few seconds), valve 328 is opened such that compressed air is heated by TSU 402, and routed to turbine 330. Turbine 330 is then driven by the heated compressed air from pressure tank 326, and in turn, powers electrical machine 332 (which is acting as a generator) to provide AC power. Converter 608 converts the AC power coming from electrical machine 332 to DC 30 power to supply DC buss 603. For a relatively short period of time, both bridging energy system 302 and the output of converter 608 are used to power critical load 340, through DC-to-AC converter 604. After this short period of time (e.g., less than approximately 10 seconds), the TACAS system of TACAS UPS system 600 becomes the only source of power for critical load 340, until utility power has returned. During the time that the TACAS system is the sole supplier of power, bridging energy system 302 begins to draw a small amount of energy from the output of converter 608 as it recharges.

As also shown in FIG. 6 by dotted line 614, relatively cool air emerging from turbine 330, exhaust 612, is optionally used to cool the various converters and other components of TACAS UPS system 600. Although exhaust 612 is generally warmer than normal ambient air, this air is generally cool relative to the various components in TACAS UPS system 600, and therefore, can provide some cooling to these components. Cool air from pressure tank 326 may also be used to cool these components before it is routed to TSU 402. Alternatively, exhaust 612 may be vented elsewhere through an exhaust pipe (not shown), or simply released to recombine with atmospheric air. The invention is not limited in this manner.

When utility power 310 returns and converter 602 is again routing power to DC buss 603, converter 608 stops routing power to DC buss 603. At this time, TSU 402 and motor 320 start drawing power from utility input 310 to heat the thermal storage material of TSU 402 back up to at least the predetermined temperature level and to refill pressure tank 326 with compressed air.

It should further be understood by those skilled in the art that a single controller such as UPS control electronics 609 may be used to control the various components and switches (not shown) in order to direct the flow of power from the appropriate power source to critical load 340. Moreover, although only shown in TACAS UPS system 600, UPS control electronics 609 may be included in any of the backup energy systems presented in accordance with the principles of the present invention.

UPS control electronics 609 monitors DC buss 603 using a sense line (not shown). Upon detecting a power failure, trigger signals (not shown) are sent to various components in TACAS UPS system 600 to ensure a continuous power supply to critical load 340. Alternatively, UPS control electronics 609 may also sense the input to converter 602 or the output of converter 604 without departing from the scope of the present invention. Furthermore, both the TACAS and UPS elements can be located in a single housing and share components (e.g., cooling fans, power supplies or a user display), thereby saving money and making TACAS UPS system 600 more compact.

Figure 7:
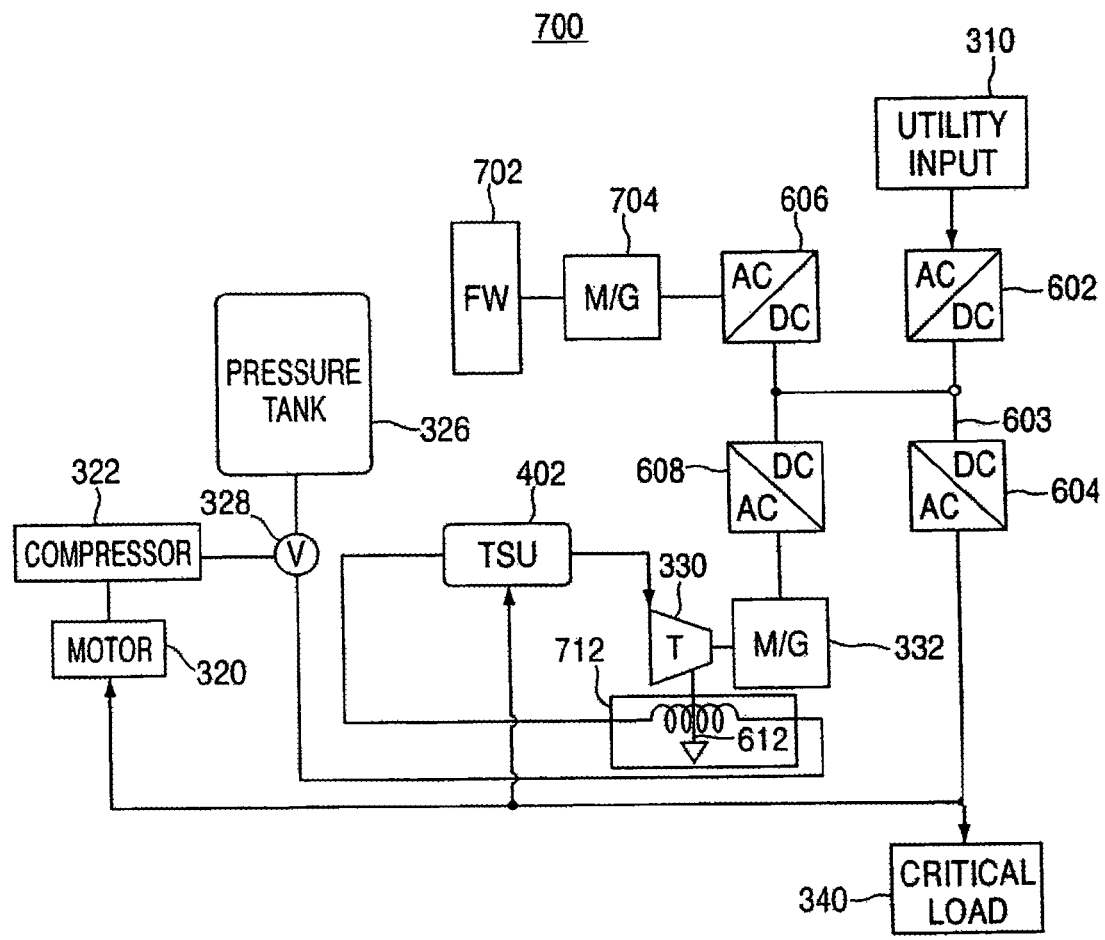
FIG. 7 is a schematic diagram of another integrated TACAS UPS system in accordance with the principles of the present invention.

Another TACAS UPS system 700 is illustrated in FIG. 7. TACAS UPS system 700 utilizes many of the components found in TACAS UPS system 600, with the primary difference between the two being that TACAS UPS system 700 utilizes a turbine exhaust heat exchanger 712. Turbine exhaust heat exchanger 712 uses exhaust 612 emerging from turbine 330 to pre-heat the generally below ambient temperature compressed air from pressure tank 326 before it is routed to TSU 402. This may result in a slightly larger and more complex system than TACAS UPS system 600, however, TACAS UPS system 700 also reduces the amount of thermal storage material necessary in TSU 402 for a given energy output, and also increases system "round trip" efficiency (defined as the electrical energy output divided by the electrical energy input of the system). This configuration also cools exhaust 612 from turbine 330 by drawing heat away, which can be important for indoor applications (e.g., applications which typically render a room too hot for occupancy).

Additionally, in TACAS UPS system 700, bridging energy system 302 is replaced by flywheel 702 and electrical machine 704. It should be understood, however, that other types of energy storage systems may be used in TACAS UPS system 700 and the remainder of the systems described herein. As illustrated in FIG. 7, when utility input 310 is supplying power, DC power from DC buss 603 is converted to AC power by converter 606. This AC power drives electrical machine 704, which in turn drives flywheel 702 to store kinetic energy in the form of rotational momentum. Alternatively, primary utility input 310 can be made to directly power electrical machine 704 without departing from the scope of the present invention. In the event of a utility power failure, flywheel 702 and electrical machine 704, now acting as a generator, use stored kinetic energy to supply DC buss 603 with power until the TACAS system begins supplying adequate power (at which time flywheel 702 begins to recharge its stored kinetic energy as described above).

Figure 8:
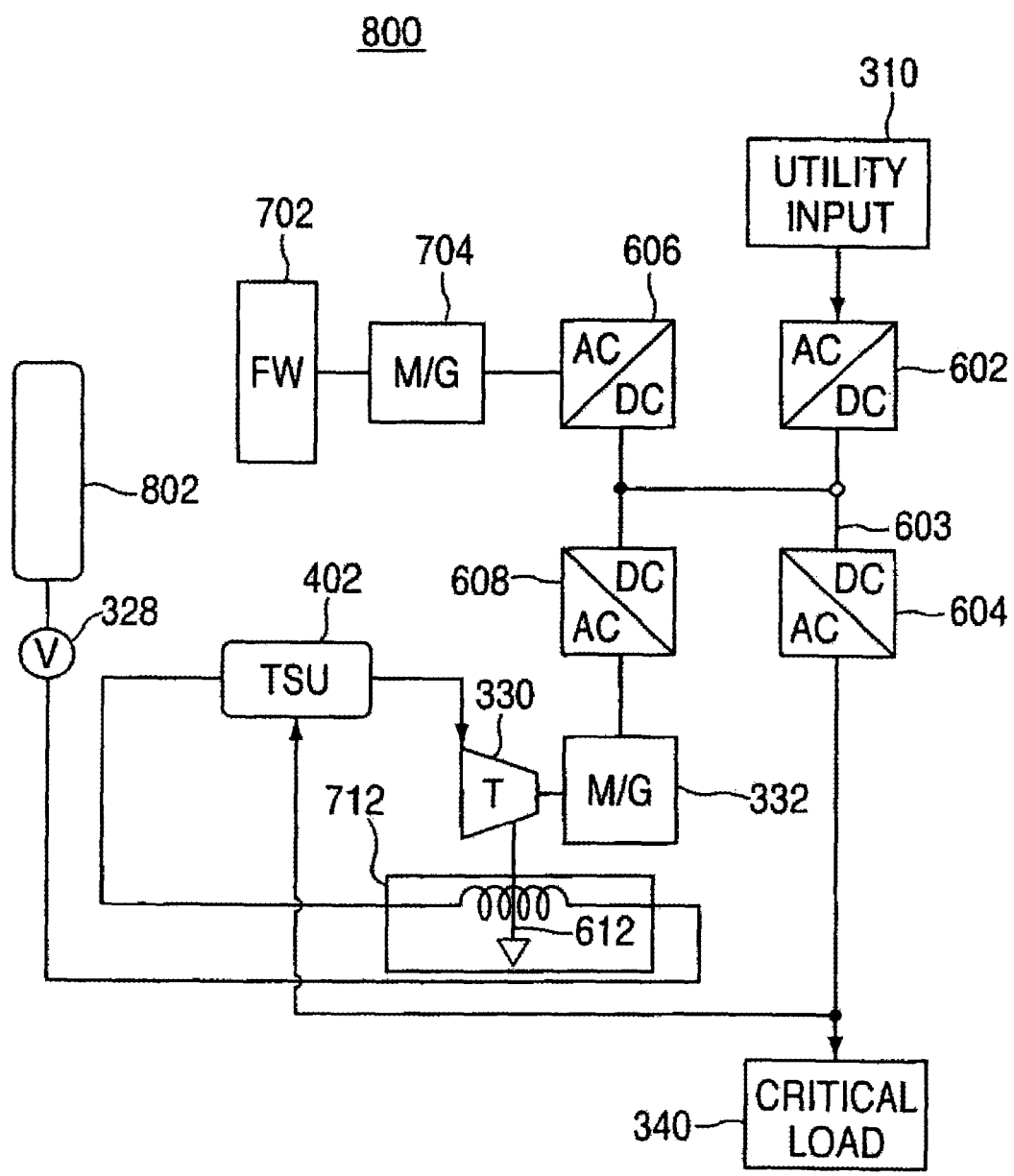
FIG. 8 is a schematic diagram of another integrated TACAS UPS system in accordance with the principles of the present invention.

FIG. 8 shows TACAS UPS system 800 which includes many of the same components found in TACAS UPS system 700 of FIG. 7, except that TACAS UPS system 800 does not use motor 320, compressor 322 or pressure tank 326. Rather, TACAS UPS system 800 uses replaceable pressure tanks or compressed air cylinders (e.g., a DOT cylinder), such as compressed air cylinder 802, in order to drive turbine 330.

As illustrated in FIG. 8, compressed air from compressed air cylinder 802 is routed through turbine exhaust heat exchanger 712 prior to being routed through TSU 402 and into the inlet of turbine 330. Persons skilled in the art will appreciate that a primary advantage of TACAS UPS system 800 over the prior systems is that, as long as replacement compressed air cylinders are available (e.g., to replace an exhausted compressed air cylinder 802), there will be an inexhaustible supply of compressed air to drive turbine 330. Accordingly, the availability of compressed air is not dependent on an external energy source (e.g., utility power) or a fuel-combustion system.

Figure 9:
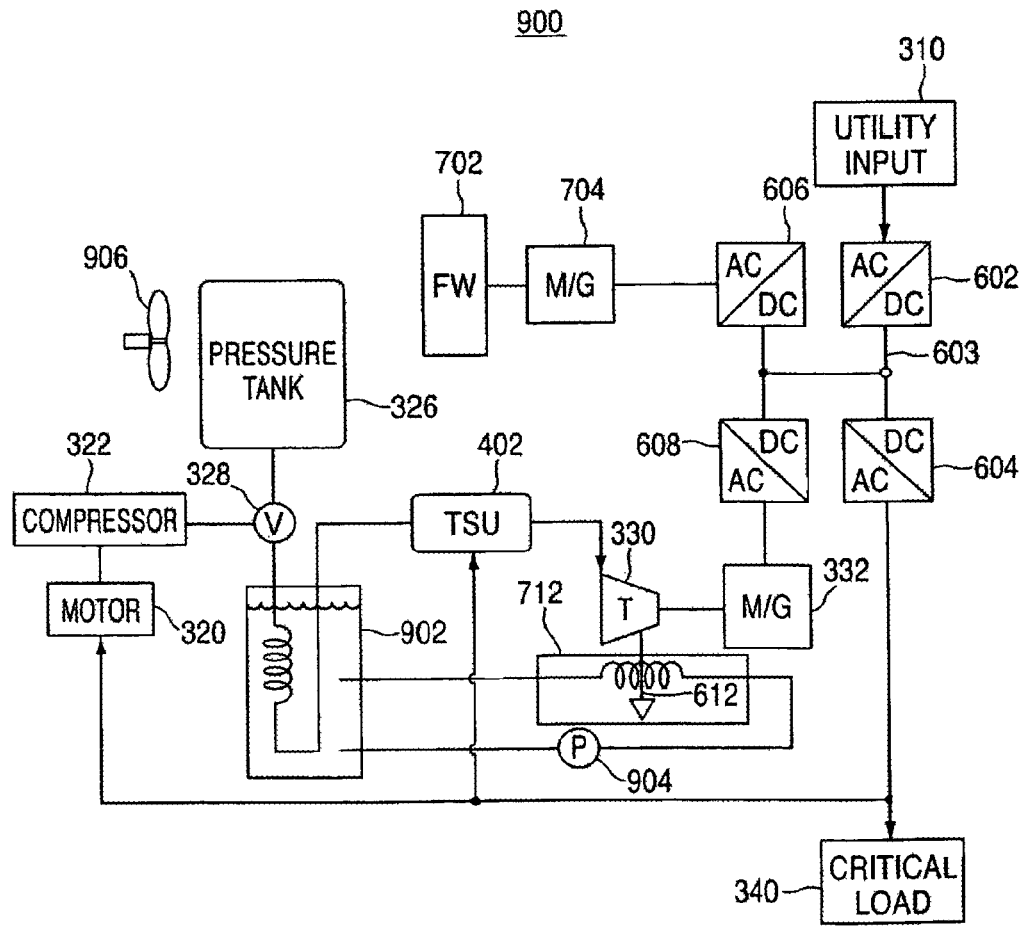
FIG. 9 is a schematic diagram of another integrated TACAS UPS system in accordance with the principles of the present invention.

FIG. 9 shows a TACAS UPS system 900 that is a slight variation with respect to the type of heat recovery used in TACAS UPS system 700. TACAS UPS system 900 includes a tank heat exchanger, or second TSU 902. TSU 902 is made up of a tank of liquid (e.g., water) that is used to pre heat cold compressed air from pressure tank 326. The liquid used by TSU 902 is pumped by pump 904 through turbine exhaust heat exchanger 712 to capture waste heat from exhaust 612 of turbine 330. Persons skilled in the art will appreciate that instead of using the heat from the exhaust of turbine 330, an ambient air heat exchanger (not shown) or other type of heat exchanger may be used to heat the liquid of TSU 902. It should also be understood that if the energy gained from the exhaust of turbine 330 is less than the energy used to pre-heat cold compressed air, the liquid's temperature (in TSU 902) will drop during the pre-heating process. If, however, the energy gained from the exhaust of turbine 330 is greater than the energy used to pre-heat cold compressed air, the liquid's temperature will rise during the pre-heating process. Therefore, additional compact and low cost heat exchangers may be added to make up for any difference between the heat required for the pre-heating process and the heat drawn from the exhaust of turbine 330. Moreover, persons skilled in the art will appreciate that TSU 902 may be used for purposes other than pre-heating compressed air from pressure tank 326 before the compressed air is routed to TSU 402. For example, TSU 902 may be used solely to draw heat away from exhaust 612 (or in different applications where exhaust 612 is relatively cool compared to the liquid of TSU 902, to cool the liquid of TSU 902). The invention is not limited in this manner.

As shown in FIG. 9, TACAS UPS system 900 also includes an optional fan 906 (which can operate at variable speeds) located near pressure tank 326. Using fan 906, together with the remaining components described above, TACAS UPS system 900 provides an integrated source of backup power and backup HVAC. If the temperature in the room or enclosure (not shown) containing TACAS UPS system 900 rises above a predetermined level, for example, a controller (not shown) can make fan 906 spin faster in order to transfer more of the relatively cool air surrounding pressure tank 326 throughout the room. Additionally, when the temperature level is high, the controller can make pump 904 speed up the flow of the liquid from TSU 902 so that turbine exhaust heat exchanger 712 absorbs more heat from turbine exhaust 612 and deposits the heat into the tank of TSU 902.

Alternatively, if the temperature in the room drops below a predetermined level, for example, the controller (not shown) can slow down the speed of fan 906 or stop it altogether. The controller can also decrease the flow rate of the liquid from TSU 902, so that less heat from turbine exhaust 612 is captured and stored in TSU 902. This, in turn, would compensate for temperatures that are too cold.

Persons skilled in the art will appreciate that TACAS UPS system 900 can provide backup HVAC without using turbine exhaust heat exchanger 712 or TSU 902. For example, the UPS components alone, which give off heat, can be used to heat the room, while fan 906 can be used to provide the cooling. Moreover, instead of or in conjunction with the use of fan 906 to provide cooling, valve 328 can also be configured to release a portion of the compressed air from pressure tank 326 to provide direct cooling of the room. This released air from pressure tank 326 can be dispersed throughout the room, or can be routed to a desired location to provide isolated cooling within the room.

Figure 10:
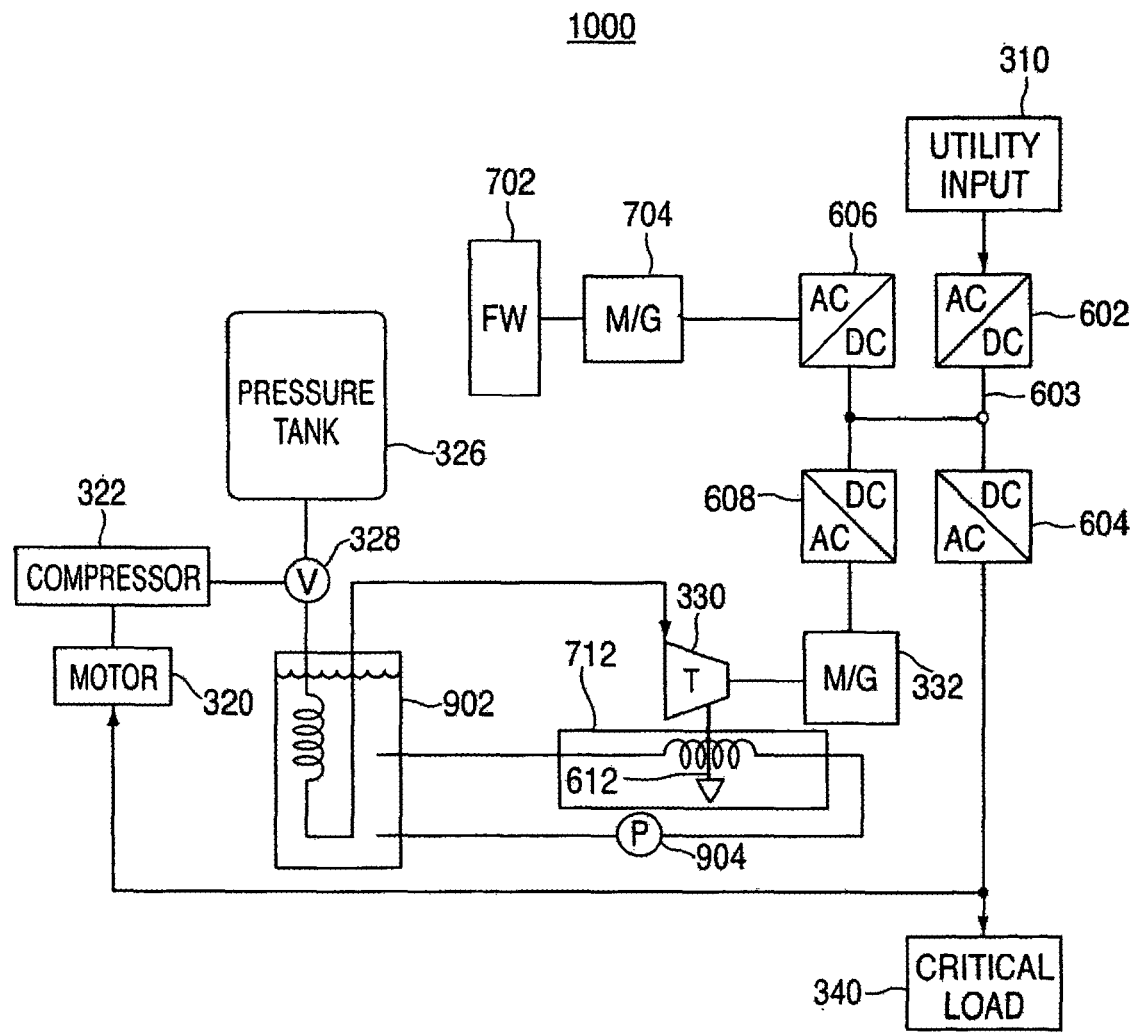
FIG. 10 is a schematic diagram of another integrated TACAS UPS system in accordance with the principles of the present invention.

FIG. 10 shows another TACAS UPS system 1000 in accordance with the principles of the present invention which is identical to TACAS UPS system 900 of FIG. 9, except that TSU 402 has been removed. Accordingly, compressed air from pressure tank 326 is solely heated by heat exchangers 712 and 902 prior to being supplied to turbine 330. While this configuration limits the ability to heat compressed air from pressure tank 326, the heat supplied from heat exchangers 712 and 902 are often sufficient for this purpose. Accordingly, the removal of TSU 402 may be desirable in order to result in less power being used to pre-heat compressed air prior to entering the inlet of turbine 330 and to reduce the complexity of the system.

Moreover, although two specific heat exchangers are shown in TACAS UPS system 1000, the invention is not limited in this manner. Other arrangements of heat exchangers as discussed herein may be used for the purpose of pre-heating compressed air, absent TSU 402, without departing from the scope of the present invention.

Figure 11:
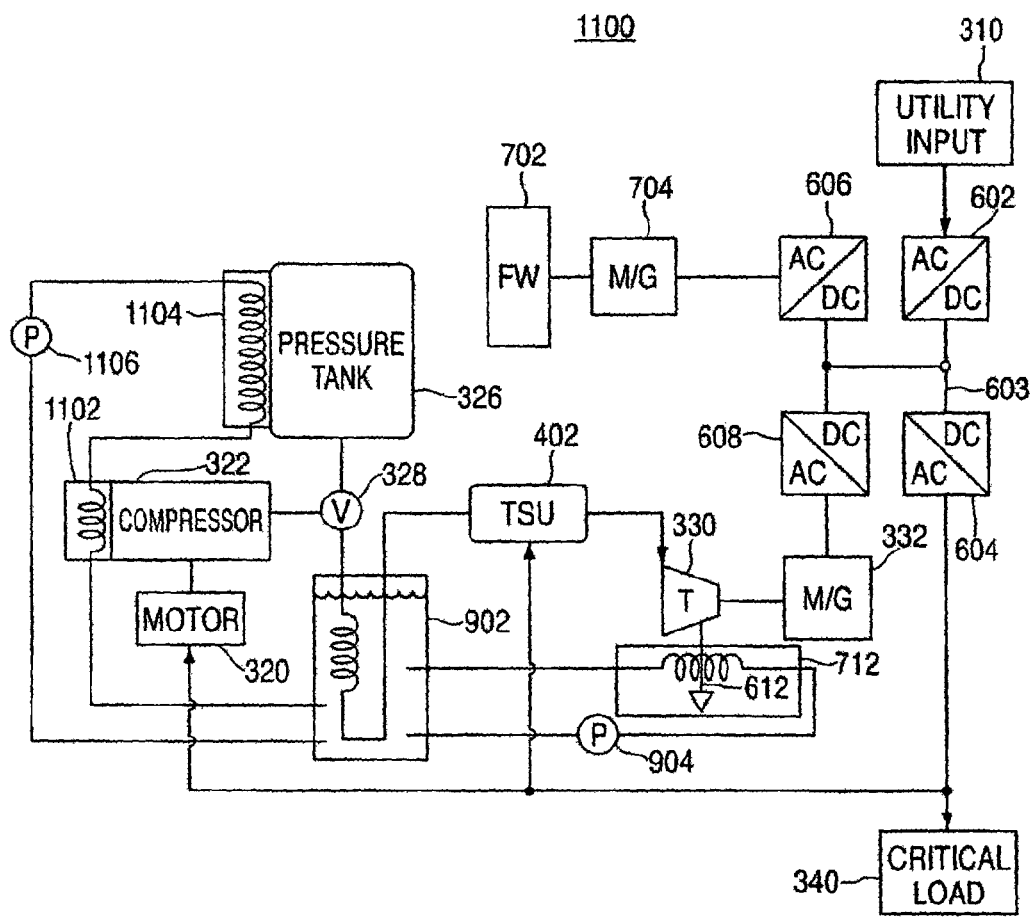
FIG. 11 is a schematic diagram of another integrated TACAS UPS system in accordance with the principles of the present invention.

FIG. 11 shows a TACAS UPS system 1100 that, while similar to TACAS UPS system 900, also includes additional heat exchangers 1102 and 1104 and additional pump 1106. As illustrated in FIG. 11, these additional heat exchangers 1102 and 1104 are used in conjunction with heat exchanger 712 (as described above). The invention, however, is not limited in this manner.

In TACAS UPS system 1100, TSU 902 derives its thermal energy (in addition to using heat exchanger 712) by using small heat exchangers 1102 and 1104 that are respectively in thermal contact with compressor 322 and pressure tank 326. In this manner, heat exchangers 1102 and 1104 capture and store the waste heat given off during the air compression process. Therefore, heat exchangers 902, 1102 and 1104, together, act as a compression process heat exchanger. Once the air compression process is complete, heat is stored in liquid form in TSU 902 in a thermally insulated reservoir. During discharge, the cold compressed air from pressure tank 326 is heated by TSU 902 (although not all three heat exchangers shown must be used) and then by main TSU 402 before being routed to turbine 330. In this configuration, for example, much of the heat lost during the compression process can be recaptured from heat stored in TSU 902.

Figure 12:
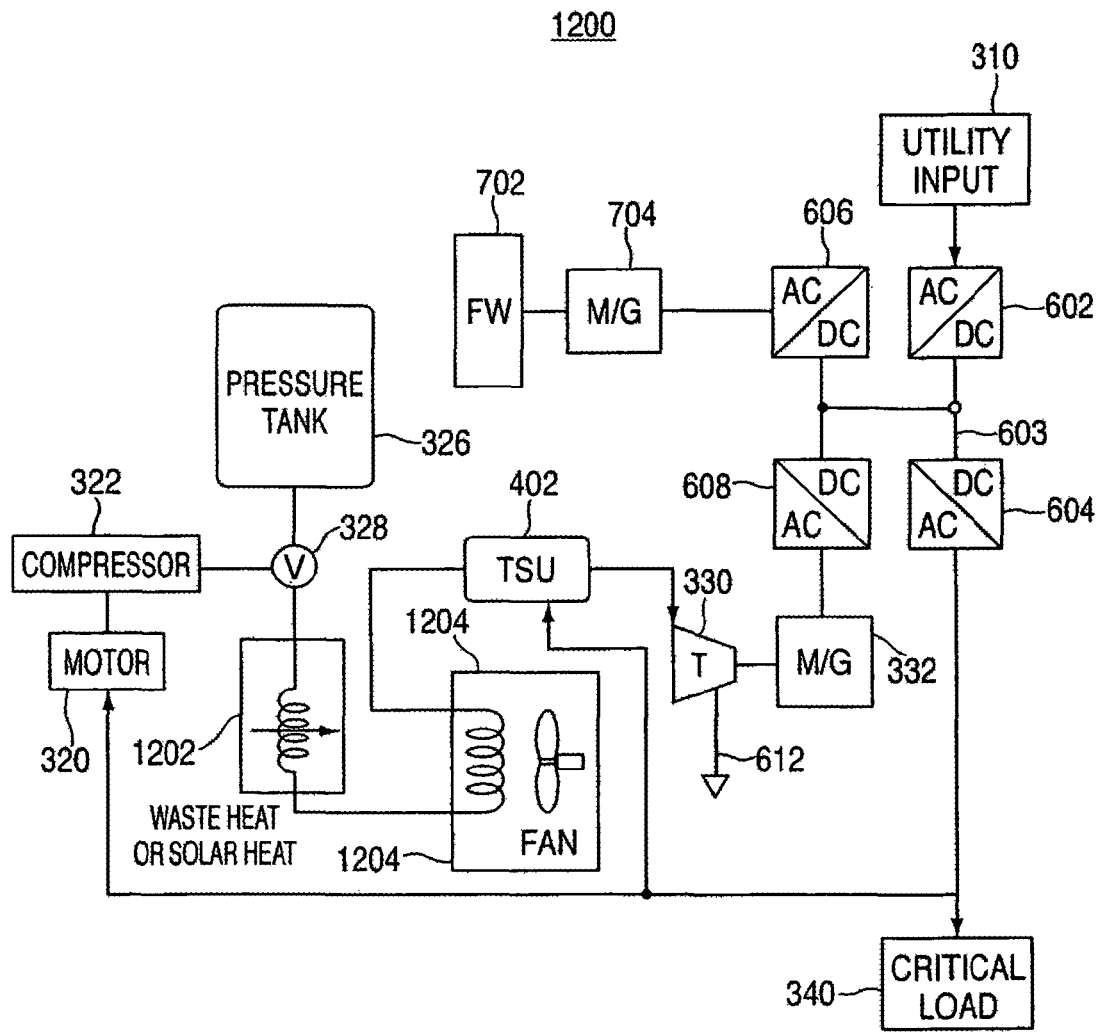
FIG. 12 is a schematic diagram of another integrated TACAS UPS system in accordance with the principles of the present invention.

FIG. 12 shows another TACAS UPS system 1200 configuration in accordance with the principles of the present invention. The primary difference between TACAS UPS system 1200 and TACAS UPS system 700 is that TACAS UPS system 1200 includes heat exchanger 1202 (e.g., a waste energy heat exchanger or a solar energy heat exchanger) and ambient air heat exchanger 1204, instead of heat exchanger 712. Heat exchanger 1202 pre-heats compressed air from pressure tank 326 before it is routed to TSU 402, but instead of using exhaust 612, uses either solar heat or waste heat (e.g., from an industrial process) to further heat compressed air from pressure tank 326. In addition, TACAS UPS system 1200 utilizes ambient air heat exchanger 1204 that uses heat from ambient air to further heat compressed air coming from pressure tank 326 prior to being supplied to TSU 402. Through this process, the surrounding ambient air is cooled at the same time that the cold compressed air from pressure tank 326 is heated. Persons skilled in the art will appreciate that other types of ambient air heat exchangers may be used without departing from the scope of the present invention. For example, a simple fan (not shown) may be placed near pressure tank 326 which blows the cold air surrounding pressure tank 326. Accordingly, any suitable type of ambient air heat exchanger may be used to maintain the temperature of the room (within which the TACAS UPS system or backup energy system is located) at an acceptable level by providing an appropriate level of cooling using the cold compressed air in pressure tank 326. The invention is not limited in this manner.

As with the previously described TACAS UPS systems and other backup energy systems, the introduction of additional heat exchangers may add cost and complexity to the system, however, also increases system efficiency and reduced the necessary amount of thermal storage material in TSU 402 for a given energy output. It should also be noted that although heat exchangers 1202 and 1204 are shown as pre-heating air from pressure tank 326 in a particular order, the invention is not limited in this manner. Any combination of these or other types of heat exchangers described in accordance with the principles of the present invention may be used without limitation to a particular order in which the compressed air from pressure tank 326 is pre-heated. Moreover, moving the location of a heat exchanger (such as ambient air heat exchanger 1204) could provide additional benefits.

Figure 13:
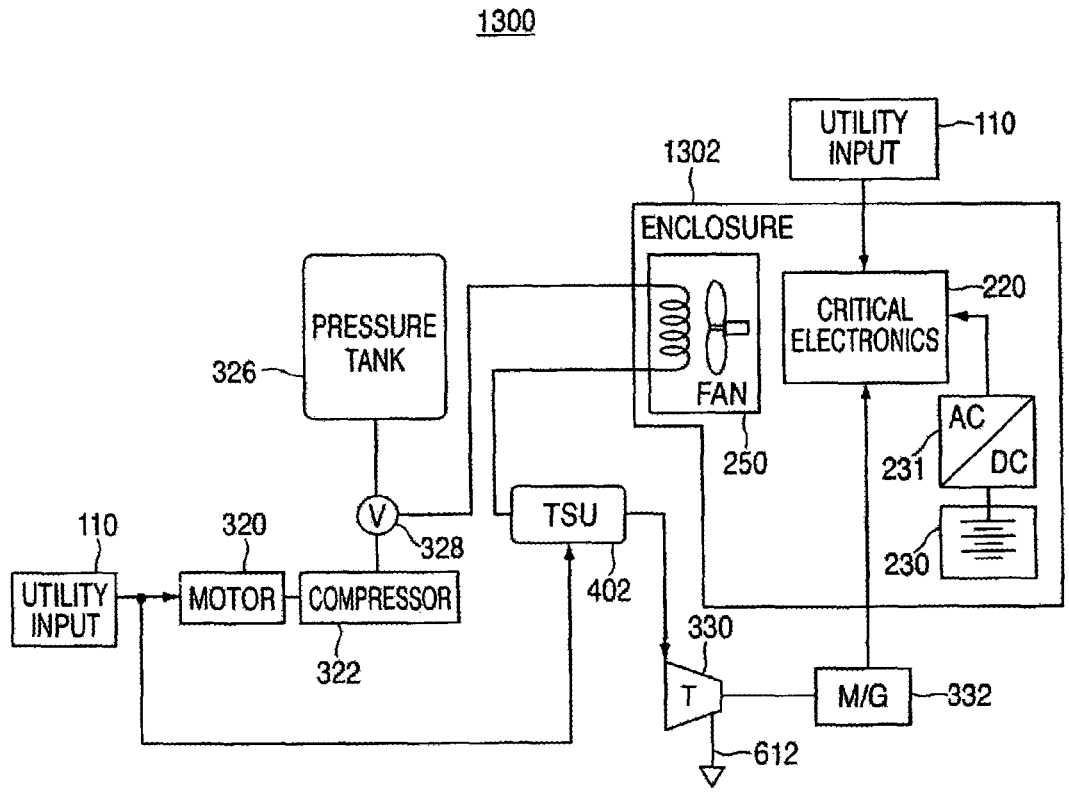
FIG. 13 is a schematic diagram of a backup energy system for providing backup power to a load while also providing backup HVAC in accordance with the principles of the present invention.

FIG. 13 is a schematic diagram of a backup energy system 1300 for providing backup power to critical electronics 220 while also providing backup HVAC in accordance with the principles of the present invention. In backup energy system 1300, utility input 110 provides power to critical electronics 220 during normal operating conditions. Backup power is provided to critical electronics 220 by chemical battery bank 230, through converter 231, and the TACAS components (as described above). It should be noted that instead of chemical battery bank 230, a flywheel or capacitor, for example, can be used to provide short term backup power. Once utility input 110 fails, chemical battery bank 230 and the TACAS components are used to ensure a continuous power feed to critical electronics 220.

Meanwhile, backup energy system 1300 provides backup HVAC in the following manner. Cold air from pressure tank 326 is routed through an ambient air heat exchanger 250 (now located within housing 1302). As a result, not only is cold air from pressure tank 326 pre-heated prior to entering TSU 402 (by the air from within housing 1302), but the air within housing 1302 is also cooled. If additional cooling is desired, the fan of ambient air heat exchanger 250 can be made to spin faster. Alternatively, if less cooling is desired, the fan of ambient air heat exchanger 250 can be slowed down.

It should be understood by those skilled in the art that it may be desirable to provide DC power to critical electronics 220, in which case converter 231 is not necessary and additional converters may be added to convert AC power from electric machine 332 and utility power 110 to DC power to be supplied to critical electronics 220. The invention is not limited in this manner.

Figure 14:
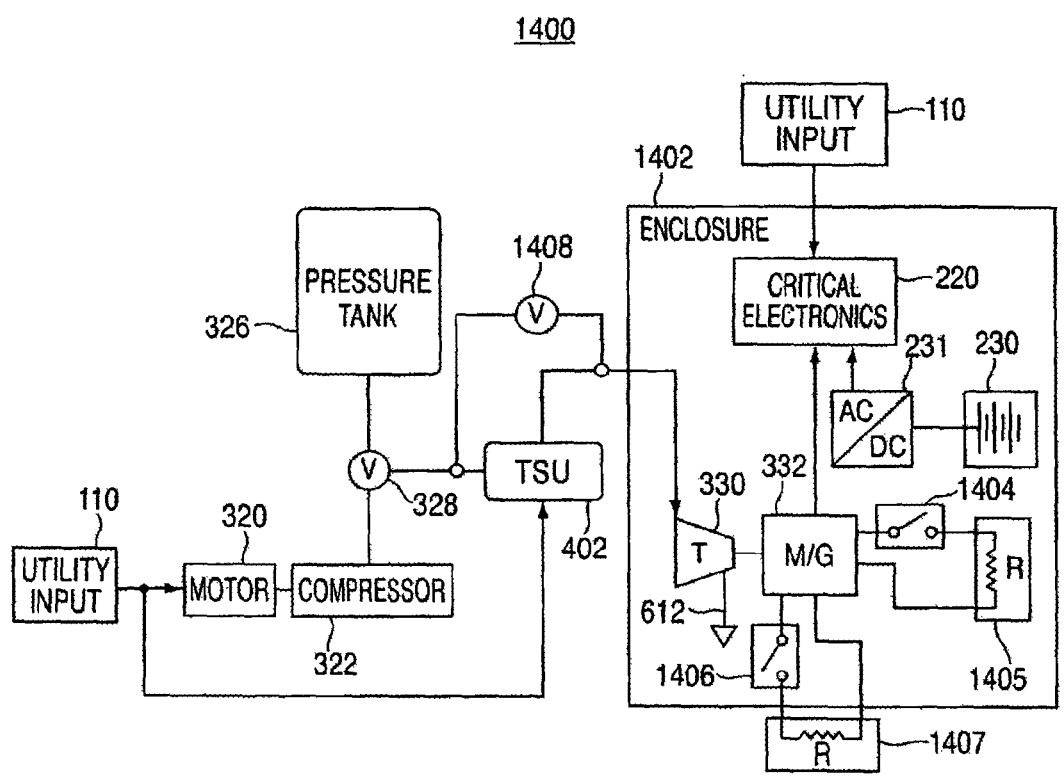
FIG. 14 is a schematic diagram of another backup energy system for providing backup power to a load while also providing backup HVAC in accordance with the principles of the present invention.

FIG. 14 shows another backup energy system 1400 for providing backup power to critical electronics 220 while also providing backup HVAC in accordance with the principles of the present invention. Backup energy system 1400 provides backup power to critical electronics 220 similarly to the manner in which backup power is provided in backup energy system 1300. In order to further control the temperature within housing 1402, however, backup energy system 1400 also includes bypass valve 1408, switches 1404 and 1406, and resistive circuits 1405 and 1407.

If the air within housing 1402 is too warm, relatively cool exhaust 612 from turbine 330 can be used to directly cool the air inside (as shown), as opposed to diverting the exhaust 612 outside of housing 1402. If additional cooling is required, switch 1406 can be closed, causing electrical power from electrical machine 332 to be dissipated in resistive circuit 1407 (e.g., a resistor as shown) outside of housing 1402 and thus making turbine exhaust 612 cooler. If maximum cooling is required, bypass valve 1408 can be completely opened so that cool air from pressure tank 326 is not heated by TSU 402 prior to passing through turbine 330. To achieve intermediate levels of cooling, meanwhile, valve 1408 can be adjusted to permit a desirable percentage of the air from pressure tank 326 to bypass TSU 402.

On the other hand, if the air inside housing 1402 is too cold, all of the air coming from pressure tank 326 can be optionally pre-heated by additional heat exchangers (not shown) and then routed through TSU 402 before being supplied to turbine 330. Additionally, switch 1404 can be closed, causing the consumption of electrical power from electrical machine 332 in resistive circuit 1405 (e.g., a resistor as shown) near a component that requires heat inside of enclosure 1402.

Although FIGS. 13 and 14 show two particular embodiments of energy systems providing backup power and HVAC, the present invention is not limited in this manner. Additional heat exchangers or other components, as previously described, may be included without departing from the scope of the invention. Moreover, persons skilled in the art will appreciate that the principles of the present invention can be applied to specific types of commercially available housing units (e.g., a standard computer rack) to provide different types of HVAC as desired. For example, a standard 19" computer enclosure can be used with the backup TACAS UPS and HVAC systems described above.

Figure 15:
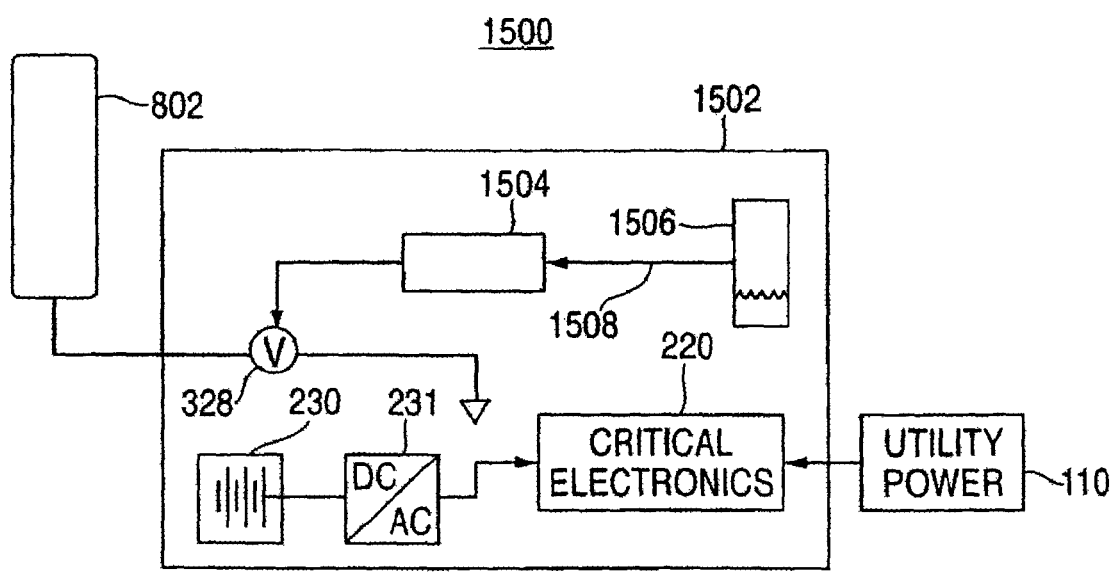
FIG. 15 is a schematic diagram of a simplified backup HVAC system in accordance with the principles of the present invention.

FIG. 15 shows a schematic diagram of a simplified backup HVAC system 1500 in accordance with the principles of the present invention. Housing (or enclosure) 1502 can be any conventional type of housing (e.g., a standard computer enclosure as explained above) which holds critical electronics 220 or other components for which cooling is desired.

Housing 1502 shown in FIG. 15 connects to a purchased or rented pressure tank 802. Pressure tank 802 may be, for example, a replaceable compressed air cylinder that is replaced with a tank full of compressed air once it has emptied. Alternatively, although not shown, pressure tank 802 may also use a compressor to produce compressed air which is stored in pressure tank 802.

Backup HVAC system 1500 also includes temperature measurement device 1506. Device 1506, which may be any suitable device capable of sensing the temperature inside of housing 1502 and conveying a signal based on this temperature, sends a signal 1508 to controller 1504 once the temperature inside housing 1502 rises above a predetermined level. Depending on signal 1508, controller 1504 opens valve 328 such that a desirable amount of cool air from pressure tank 802 flows into housing 1502, thereby cooling critical electronics 220; chemical battery bank 230 (or any other suitable type of energy storage system) and converter 231. In this manner, as long as relatively cold compressed air is available, cooling may be provided to the components located inside housing 1502 regardless of available power sources.

Persons skilled in the art will appreciate that the backup energy systems and TACAS UPS systems discussed above in accordance with the principles of the present invention may be combined to meet the requirements of a particular application. Accordingly, each of the configurations described herein can be modified so that functions of one configuration are combined or interchanged with the functions of another configuration without departing from the scope of the present invention. For example, each of the embodiments described herein in accordance with the principles of the present invention may utilize a compressor and a pressure tank to store compressed air, or alternatively, a replaceable compressed air cylinder may be used without departing from the scope of the present invention. Additionally, although a flywheel is used as the bridging energy system in several of the above described embodiments, other types of backup energy sources may be used (e.g., a bank of chemical batteries) in any of the configurations.

Figure 16:
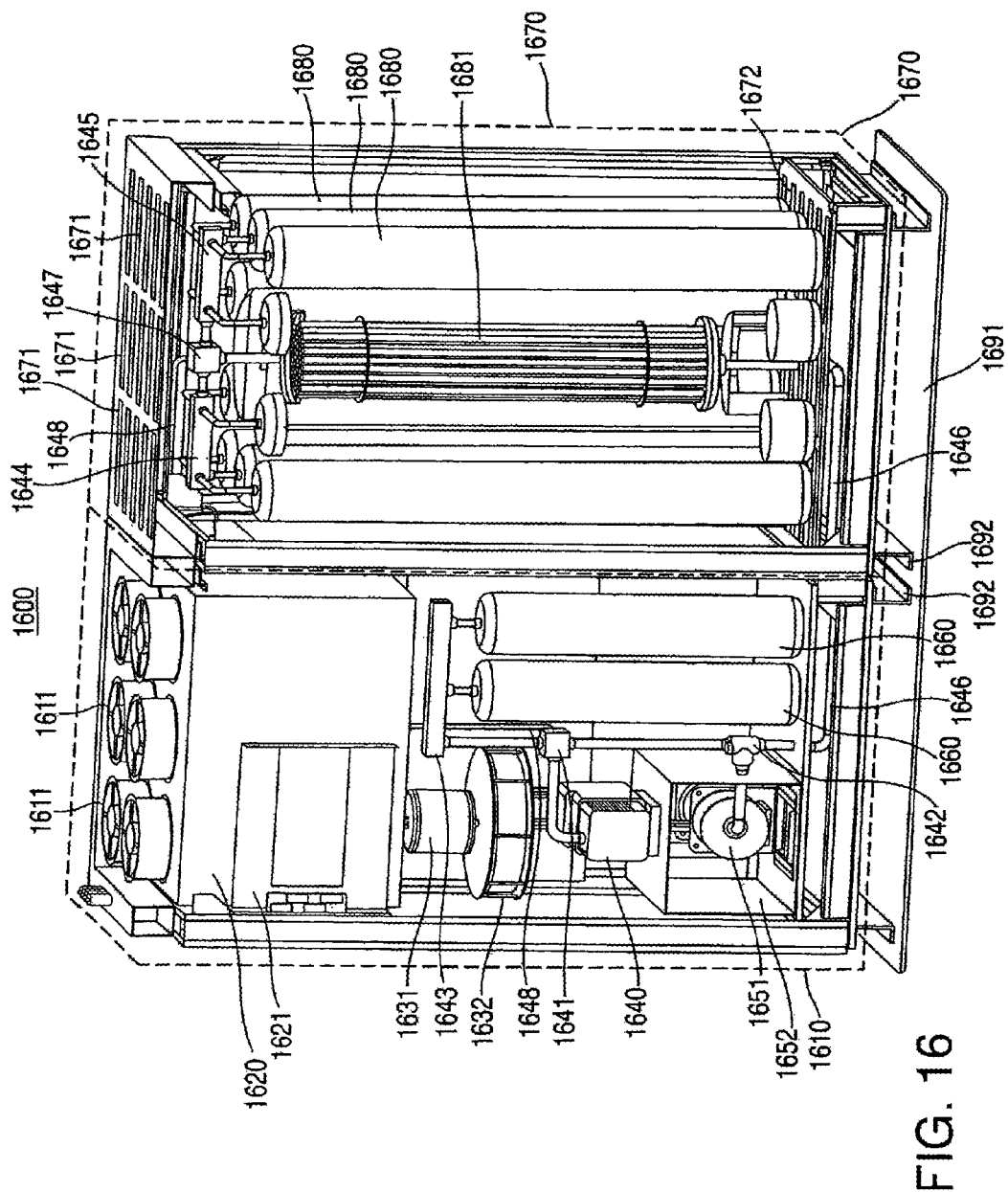
FIG. 16 is a three-dimensional perspective view of a TACAS UPS system in accordance with the principles of the present invention.

FIG. 16 shows a three-dimensional embodiment of a TACAS UPS system 1600 constructed in accordance with the principles of the present invention. TACAS UPS system 1600 includes main UPS cabinet 1610 and optional cabinet 1670 (which, as further explained below, can be left out), both of which are shown without the side panels to facilitate the viewing of their respective internal components. It should be understood that cabinets 1610 and 1670 are each preferably enclosed by sheet metal or another suitable material, with doors in the front to allow a user to reach the components located within the sheet metal.

Main UPS cabinet 1610 includes several components which together act to provide uninterruptible power to a load (not shown). Main UPS cabinet 1610 includes a UPS electronics unit 1620 (having a hinged door 1621 to permit easy access). UPS electronics unit 1620 is kept at a relatively cool temperature through the use of standard fans 1611. Additionally, fans 1611 may also be used to pull relatively warm ambient air over small pressure tanks 1660 (thus heating small pressure tanks 1660), thereby enhancing the efficiency of TACAS UPS system 1600. Moreover, although a particular number of fans are shown in FIG. 16, the number of fans 1611 may be changed as desired without departing from the scope of the invention. Moreover, the control of fans 1611 may be automated (e.g., controlled by a temperature measurement device as described above) or may be controlled directly by a user. For greater cooling, the speed of fans 1611 may be increased. Meanwhile, for reduced or no cooling, the speed of fans 1611 may be reduced or the fans may be shut down.

Main UPS cabinet 1610 also includes an integrated turbine generator 1651 which is driven by compressed air from small pressure tanks 1660 to generate power as needed. Air from small pressure tanks 1660 is routed through manifold 1643 to valve 1641. When turbine generator 1651 is to supply power, valve 1641 is opened to allow compressed air originating from small pressure tanks 1660 to drive turbine generator 1651. Additionally, a compressor 1640 rests on top of compressor mount 1652, which preferably acts as a sound barrier to reduce noise emissions from the turbine generator 1651. Compressor 1640 is used to refill small pressure tanks 1660 through valve 1641 and manifold 1643, and may be powered by the primary power source or another suitable source of power.

In order to ensure continuous power to a load, UPS electronics unit 1620 also uses another source of backup power to provide bridging energy between the time a primary power source has failed and the time that turbine generator 1651 beings supplying adequate power. In this embodiment, the bridging energy is provided to UPS electronics unit 1620 using a flywheel 1632 and a motor/generator 1631. When primary power is available, motor/generator 1631, which is acting as a motor, uses the primary power to maintain the rotation of flywheel 1632. Once there is an interruption in the primary power source, controller electronics (not shown) within UPS electronics unit 1620 signals motor/generator to begin operating as a generator, which is driven by the kinetic energy stored in flywheel 1631 is the form of rotational momentum. It should be understood that although a flywheel and a motor/generator are used in TACAS UPS system 1600 to provide bridging energy, the invention is not limited in this manner. For example, a bank of chemical batteries could be used instead in order to provide the bridging energy necessary to ensure continuous power is supplied to the load.

Main UPS cabinet 1610 does not include a TSU for preheating compressed air from small pressure tanks 1660 before the compressed air is routed to turbine generator 1651. Omitting a TSU results in less power output availability for a given volume and pressure of compressed air, however, is also results in main cabinet 1610 having lower cost and complexity and a faster response time (because air does not need to be routed through a TSU). It should be understood, however, that one or more TSU's may be included in main UPS cabinet 1610 in accordance with the principles of the present invention.

Optional cabinet 1670 is used during prolonged outages of the primary power source (e.g., if a long-term source of backup power is not available). As shown in FIG. 16, optional cabinet 1670 includes secondary pressure tanks 1680 and a TSU 1681. When secondary pressure tanks 1680 are used to drive turbine generator 1651 (either in conjunction with small pressure tanks 1660 or alone), air is routed from secondary pressure tanks 1680 through manifolds 1644 and 1645 and valve 1647 and through TSU 1681. TSU 1681 may be, for example, steel which is kept at a relatively high temperature using an electric resistive heater (not shown). Additionally, insulation may be used to prevent heat from being released from TSU 1681 (as shown in FIG. 16). Once the compressed air coming from secondary pressure tanks 1680 has been heated by TSU 1681, this heated air travels through pipe 1646 and T-connection 1642 to drive turbine generator 1651. It should be understood that T-connection 1642 may be eliminated if optional cabinet 1670 is not being used, in which case compressed air from small pressure tanks 1660 would flow through valve 1641 and directly to turbine generator 1651 (instead of through T-connection 1642 as currently shown).

Once secondary pressure tanks 1680 are depleted of compressed air, they may be either replaced or refilled using compressor 1640. In the latter case, air is supplied back via the same bi-directional route. (e.g., through pipe 1646) to refill secondary pressure tanks 1680 with compressed air. Control line 1648 carries control signals (e.g., through an electrical wire) to, for example, open or close valves to allow proper routing of compressed air.

Furthermore, when optional cabinet 1670 is being used, exhaust air from turbine generator 1651 may be used to preheat air to be heated by TSU 1681. This is accomplished by routing exhaust air from turbine generator 1651 through an exhaust pipe (not shown) to the grated bottom 1672 of optional cabinet 1670. This relatively hot exhaust air is then cooled as it flows up passed the relatively cold secondary pressure tanks 1680 and out vents 1671, thereby increasing runtime by heating secondary pressure tanks 1680 as they discharge.

Persons skilled in the art will appreciate that the features of the various embodiments described above in accordance with the principles of the present invention may also be incorporated into TACAS UPS system 1600. For example, various heat exchangers may be included in main UPS cabinet 1610. Moreover, relatively cold compressed air from small pressure tanks 1660 or secondary pressure tanks 1680 may be released into the air to provide cooling. Accordingly, TACAS UPS system 1600 may provide heating or cooling for components located within the system itself, or for a room or other enclosure in which the system is located. The invention is not limited in this manner.

As also shown in FIG. 16, cabinets 1610 and 1670 are mounted on a concrete slab 1691 using mounting cleats 1692. Nevertheless, alternative support may be provided to retain the positioning of cabinets 1310 and 1370 without departing from the scope of the present invention.

Figure 17:
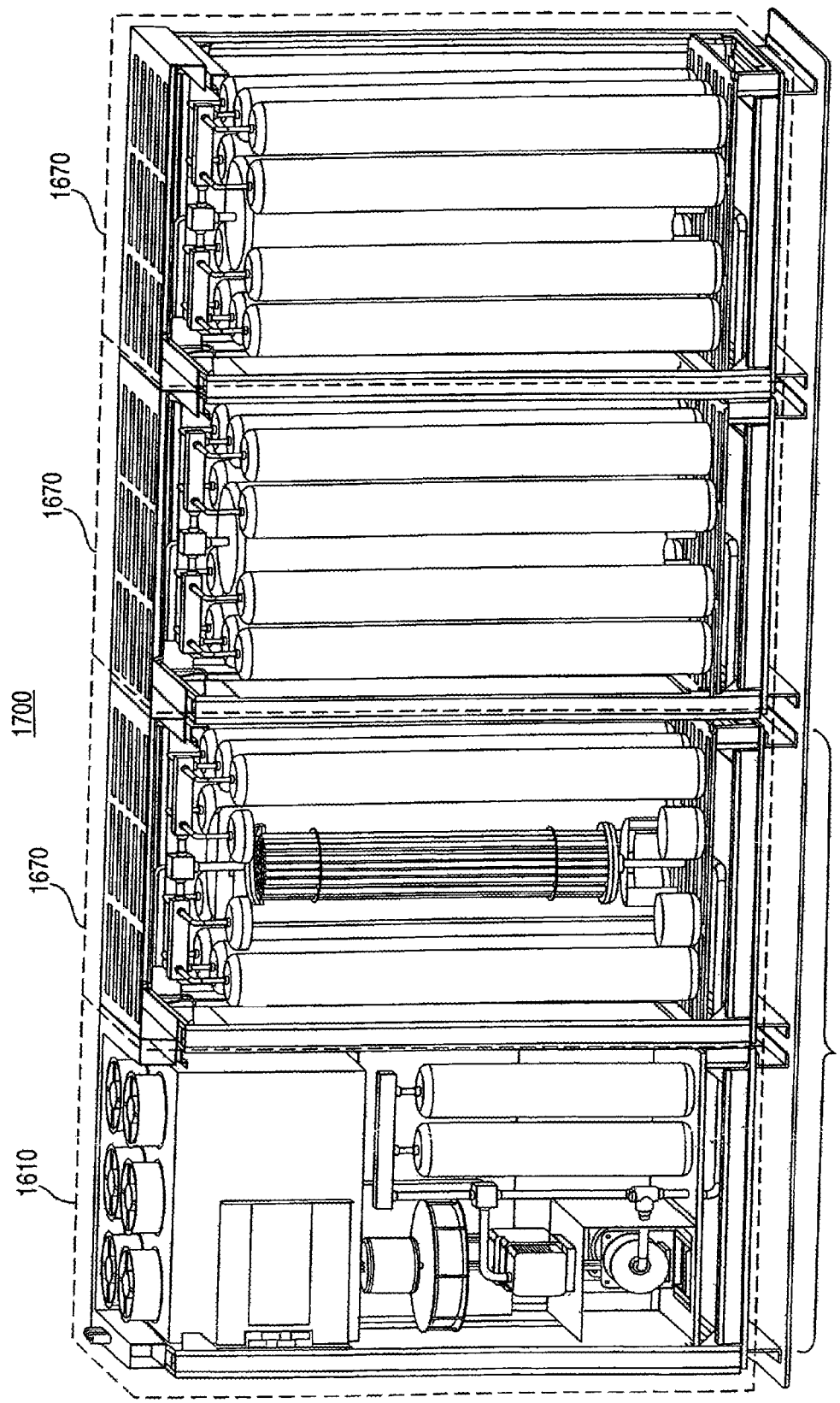
FIG. 17 is a three-dimensional perspective view of another TACAS UPS system in accordance with the principles of the present invention.

FIG. 17 shows another three-dimensional embodiment of a TACAS UPS system 1700 constructed in accordance with the principles of the present invention. TACAS UPS system 1700 is similar to TACAS UPS system 1600, except that additional optional cabinets 1670 have been added to provide a longer runtime. In this manner, additional secondary pressure tanks from within additional optional cabinets 1670 may be used to drive turbine generator 1651 (as described above) when backup power is needed. The supplying of compressed air to turbine generator 1651 is accomplished through the connection of the various pipes 1646 emerging from the multiple optional cabinets 1670. Moreover, compressor 1640 may be used to refill the secondary pressure tanks 1680 located in each of the additional optional cabinets 1670 (as described above).

The above described embodiments of the present invention are presented for purposes of illustration and not of limitation, and the present invention is limited only by the claims which follow.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system comprising:
a source of compressed air;
a fluid powered rotary engine coupled to the source of compressed air, the fluid powered rotary engine operable to be driven by the compressed air engine;
an electrical generator powered by said fluid powered rotary engine, said electrical generator operable to provide backup power to a critical load; and
a bridging energy system operable to provide backup power to said critical load during a disturbance in a supply of power from a primary power source at least until said electrical generator provides said backup power to said critical load, said bridging energy system operable to power to said critical load independent of said fluid powered rotary engine and said primary power source.

2. The system of claim 1, wherein said source of compressed air comprises: a compressor that compresses air; and an air reservoir operable to collect said compressed air.

3. The system of claim 2, wherein said air reservoir is a pressure tank.

4. The system of claim 2, wherein said air reservoir is an underground salt dome.

5. The system of claim 1, further comprising: switching circuitry operable to switch a source of power to said critical load between said primary power source and a source of backup power, said source of backup power comprising said electrical generator and said bridging energy system; and uninterruptible power supply (UPS) control electronics that control at least said switching circuitry and said fluid powered rotary engine based on quality of power from said primary power source.

6. The system of claim 5, wherein said switching circuit switches said source of power to said critical load from said primary power source to said source of backup power during degradation of said power from said primary power source.

7. The system of claim 5, wherein said switching circuit switches said source of power to said critical load from said primary power source to said source of backup power during a loss of power from said primary power source.

8. The system of claim 1, further comprising: at least one fuel-combustion system coupled between said source of compressed air and said fluid powered rotary engine to heat said compressed air, said at least one fuel-combustion system providing heated compressed air to said fluid powered rotary engine.

9. The system of claim 8, further comprising: switching circuitry that switches said source of power to said critical load between said primary power source and a source of backup power, said source of backup power comprising said electrical generator and said bridging energy system; and uninterruptible power supply (UPS) control electronics that controls at least said switching circuitry and said fluid powered rotary engine based on said quality of power from said primary power source.

10. The system of claim 9, wherein said switching circuit switches said source of power to said critical load from said primary power source to said source of backup power during degradation of said power from said primary power source.

11. The system of claim 9, wherein said switching circuit switches said source of power to said critical load from said primary power source to said source of backup power during a loss of power from said primary power source.

12. An integrated uninterruptible power supply (UPS) system operable to provide backup power to a critical load, said system comprising:
a fluid powered rotary engine-generator system comprising:
a source of compressed air;
a fluid powered rotary engine coupled to said source of compressed air to receive said compressed air, said received compressed air driving said fluid powered rotary engine; and
an electrical generator powered by said fluid powered rotary engine, said generator providing said backup power;
a bridging energy system that, during a disturbance in a supply of power from a primary power source, provides said backup power to a critical load during said disturbance at least until said electrical generator begins providing said backup power, wherein said bridging energy system provides said backup power to said critical load independent of said fluid powered rotary engine-generator system and said primary power source;
switching circuitry that switches said source of power to said critical load between said primary power source and a source of backup power, said source of backup power comprising said electrical generator and a said bridging energy storage system; and
uninterruptible power supply (UPS) control electronics that control at least said switching circuitry and said fluid powered rotary engine based on quality of power from said primary power source.

13. The system of claim 12, wherein each of said fluid powered rotary engine, said electrical generator, said bridging energy system and said switching circuitry are located within a single housing.

14. The system of claim 12, further comprising: at least one exhaustless heater coupled between said source of compressed air and said fluid powered rotary engine to heat said compressed air, said exhaustless heater providing heated compressed air to said fluid powered rotary engine.

15. The system of claim 12, wherein said fluid powered rotary engine, said electrical generator, said bridging energy system and said switching circuitry share at least one fan.

16. The system of claim 12, wherein said fluid powered rotary engine, said electrical generator, said bridging energy system and said switching circuitry share at least one power supply.

17. A method for providing backup power to a critical load during a disturbance in a supply of power from a primary power source, said method comprising:
driving a fluid powered rotary engine using compressed air;
powering an electrical generator with said fluid powered rotary engine to provide backup power during said disturbance; and
supplying bridging energy to said critical load during said disturbance at least until said electrical generator begins supplying said backup power, wherein said bridging energy is provided to said critical load independent of said backup power provided by said fluid powered rotary engine-generator system and said primary power source.

18. The method of claim 17, further comprising: using at least one exhaustless heater to heat said compressed air prior to said compressed air driving said fluid powered rotary engine.

19. The method of claim 18, wherein at least a portion of said compressed air bypasses said exhaustless heater.

* * * * *